(12) United States Patent
Zhou et al.

(10) Patent No.: US 11,588,535 B2
(45) Date of Patent: Feb. 21, 2023

(54) DYNAMIC BEAM-SWITCHING LATENCY FOR BEAM REFINEMENT PROCEDURES

(71) Applicant: QUALCOMM Incorporated, San Diego, CA (US)

(72) Inventors: Yan Zhou, San Diego, CA (US); Tao Luo, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/412,473

(22) Filed: Aug. 26, 2021

(65) Prior Publication Data

US 2021/0384957 A1 Dec. 9, 2021

Related U.S. Application Data

(62) Division of application No. 16/272,327, filed on Feb. 11, 2019, now Pat. No. 11,139,880.

(Continued)

(51) Int. Cl.
*H04W 72/04* (2009.01)
*H04B 7/06* (2006.01)
(Continued)

(52) U.S. Cl.
CPC ......... *H04B 7/0695* (2013.01); *H04B 7/0421* (2013.01); *H04B 7/0626* (2013.01);
(Continued)

(58) Field of Classification Search
None
See application file for complete search history.

(56) References Cited

U.S. PATENT DOCUMENTS

2017/0207845 A1 7/2017 Moon et al.
2017/0332359 A1 11/2017 Tsai et al.
(Continued)

FOREIGN PATENT DOCUMENTS

WO 2017196612 A1 11/2017

OTHER PUBLICATIONS

International Search Report and Written Opinion—PCT/US2019/025708—ISA/EPO—dated Jun. 19, 2019.
International Preliminary Report on Patentability—PCT/US2019/025708, The International Bureau of WIPO—Geneva, Switzerland, dated Nov. 9, 2020.

*Primary Examiner* — Sai Aung
(74) *Attorney, Agent, or Firm* — Patterson + Sheridan, LLP

(57) ABSTRACT

Certain aspects of the present disclosure provide techniques for beam refinement procedures including dynamic signaling and/or selection of beam-switching latency for beam refinement procedures using inter- and/or intra-antenna module beam switching. A method by a base station (BS) includes configuring a user equipment (UE) with one or more reference signal (RS) resource sets. Each of the one or more RS resource sets is associated with a first or second type of beam refinement procedure. The BS receives an indication from the UE of at least a first latency and a second latency, longer than the first latency. The BS dynamically selects, for each RS transmission using one of the configured resource sets, the first or second latency. The BS sends the RS transmissions at the selected latency with respect to downlink control information (DCI) triggering the RS transmissions for the first or second type of beam refinement procedure.

30 Claims, 18 Drawing Sheets

Related U.S. Application Data

(60) Provisional application No. 62/666,996, filed on May 4, 2018.

(51) Int. Cl.
| | |
|---|---|
| *H04W 72/12* | (2009.01) |
| *H04L 1/18* | (2006.01) |
| *H04B 7/0417* | (2017.01) |
| *H04L 1/1812* | (2023.01) |
| *H04B 17/364* | (2015.01) |
| *H04W 76/27* | (2018.01) |
| *H04B 17/10* | (2015.01) |

(52) U.S. Cl.
CPC ......... *H04B 17/104* (2015.01); *H04B 17/364* (2015.01); *H04L 1/1819* (2013.01); *H04W 76/27* (2018.02)

(56) References Cited

U.S. PATENT DOCUMENTS

| | | |
|---|---|---|
| 2018/0034531 A1 | 2/2018 | Sadiq et al. |
| 2018/0219606 A1 | 8/2018 | Ng et al. |
| 2018/0227031 A1 | 8/2018 | Guo et al. |
| 2018/0227886 A1 | 8/2018 | Chou et al. |
| 2019/0173622 A1* | 6/2019 | Xiong ................... H04L 1/1819 |
| 2019/0312668 A1 | 10/2019 | Park et al. |
| 2019/0341992 A1 | 11/2019 | Zhou et al. |
| 2019/0349960 A1* | 11/2019 | Li ..................... H04W 56/0015 |
| 2019/0356439 A1 | 11/2019 | Lee et al. |
| 2020/0112355 A1 | 4/2020 | Park et al. |
| 2020/0288479 A1* | 9/2020 | Xi ....................... H04W 72/042 |
| 2021/0185646 A1* | 6/2021 | Zhou ................. H04W 72/042 |
| 2022/0007248 A1* | 1/2022 | Shrestha ................. H04L 1/189 |
| 2022/0046692 A1* | 2/2022 | Huang .............. H04W 72/1273 |
| 2022/0131655 A1* | 4/2022 | Rico Alvarino ...... H04L 1/1861 |
| 2022/0311581 A1* | 9/2022 | Elshafie ............ H04W 72/0446 |

\* cited by examiner

DYNAMIC BEAM-SWITCHING LATENCY FOR BEAM REFINEMENT PROCEDURES

CROSS-REFERENCE TO RELATED APPLICATION & PRIORITY CLAIM

This application is a divisional application of U.S. application Ser. No. 16/272,327, filed Feb. 11, 2019, which claims benefit of and priority to U.S. Provisional Patent Application Ser. No. 62/666,996, filed May 4, 2018, herein incorporated by reference in their entirety as if fully set forth below and for all applicable purposes.

BACKGROUND

Field of the Disclosure

Aspects of the present disclosure relate to wireless communications, and more particularly, to techniques for beam refinement procedures including dynamic signaling and/or selection of beam-switching latency for beam refinement procedures using inter- and/or intra-antenna module beam switching.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure provide techniques for beam refinement procedures including dynamic signaling and/or selection of beam-switching latency for beam refinement procedures using inter- and/or intra-antenna module beam switching.

Certain aspects provide a method for wireless communication by a base station (BS). The method generally includes configuring a user equipment (UE) with one or more reference signal (RS) resource sets. Each of the one or more RS resource sets is associated with a first or second type of beam refinement procedure. The BS receives an indication from the UE of at least a first latency and a second latency, longer than the first latency. The BS dynamically selects, for each RS transmission using one of the configured resource sets, the first or second latency. The BS sends the RS transmissions at the selected latency with respect to downlink control information (DCI) triggering the RS transmissions for the first or second type of beam refinement procedure.

Certain aspects provide another method for wireless communication by a BS. The method generally includes sending a first RS transmission at a first latency with respect to DCI triggering the RS transmissions, using a configured RS resource set, for a first or second type of beam refinement procedure. The BS receives hybrid automatic repeat request (HARQ) feedback for the first RS transmission. One or more HARQ feedback bits indicate a preferred latency. The BS selects a second latency, for a second RS transmission using the configured resource set, based, at least in part, on the HARQ feedback.

Certain aspects provide a method for wireless communication by a UE. The method generally includes receiving signaling configuring the UE with one or more RS resource sets. Each of the one or more RS resource sets is associated with a first or second type of beam refinement procedure. The UE sends an indication to a BS of at least a first latency and a second latency, longer than the first latency. The UE receives DCI triggering RS transmissions using a RS resource set associated with the second type of beam refinement procedure. The UE determines to monitor the RS transmissions at the first or second latency, with respect to the DCI.

Certain aspects provide a method for wireless communication by a UE. The method generally includes monitoring a first RS transmission from a BS at a first latency with respect to DCI triggering the RS transmissions, using a configured RS resource set associated with a first or second type of beam refinement procedure. The UE sends HARQ feedback for the first RS transmission including one or more HARQ feedback bits indicating a preferred latency. The UE monitors a second RS transmission from the BS at a second latency.

Certain aspects provide an apparatus for wireless communication. The apparatus generally includes means for configuring a UE with one or more RS resource sets. Each of the one or more RS resource sets is associated with a first or second type of beam refinement procedure. The apparatus includes means for receiving an indication from the UE of at least a first latency and a second latency, longer than the first latency. The apparatus includes means for dynamically selecting, for each RS transmission using one of the configured resource sets, the first or second latency. The apparatus includes means for sending the RS transmissions at the selected latency with respect to DCI triggering the RS transmissions for the first or second type of beam refinement procedure.

Certain aspects provide an apparatus for wireless communication. The apparatus generally includes means for sending a first RS transmission at a first latency with respect to DCI triggering the RS transmissions, using a configured RS resource set, for a first or second type of beam refinement procedure. The apparatus includes means for receiving HARQ feedback for the first RS transmission. One or more HARQ feedback bits indicate a preferred latency. The apparatus includes means for selecting a second latency, for a second RS transmission using the configured resource set, based, at least in part, on the HARQ feedback.

Certain aspects provide an apparatus for wireless communication. The apparatus generally includes means for receiving signaling configuring the apparatus with one or more RS resource sets. Each of the one or more RS resource sets is associated with a first or second type of beam refinement procedure. The apparatus includes means for sending an indication to a BS of at least a first latency and a second latency, longer than the first latency. The apparatus includes means for receiving DCI triggering RS transmissions using a RS resource set associated with the second type of beam refinement procedure. The apparatus includes means for determining to monitor the RS transmissions at the first or second latency, with respect to the DCI.

Certain aspects provide an apparatus for wireless communication. The apparatus generally includes means for monitoring a first RS transmission from a BS at a first latency with respect to DCI triggering the RS transmissions, using a configured RS resource set associated with a first or second type of beam refinement procedure. The apparatus includes means for sending HARQ feedback for the first RS transmission including one or more HARQ feedback bits indicating a preferred latency. The apparatus includes means for monitoring a second RS transmission from the BS at a second latency.

Certain aspects provide an apparatus for wireless communication. The apparatus generally includes at least one processor coupled with a memory and configured to configure a UE with one or more RS resource sets. Each of the one or more RS resource sets is associated with a first or second type of beam refinement procedure. The apparatus includes a receiver configured to receive an indication from the UE of at least a first latency and a second latency, longer than the first latency. The at least one processor is further configured to dynamically select, for each RS transmission using one of the configured resource sets, the first or second latency. The apparatus includes a transmitter configured to send the RS transmissions at the selected latency with respect to DCI triggering the RS transmissions for the first or second type of beam refinement procedure.

Certain aspects provide an apparatus for wireless communication. The apparatus generally includes a transmitter configured to send a first RS transmission at a first latency with respect to DCI triggering the RS transmissions, using a configured RS resource set, for a first or second type of beam refinement procedure. The apparatus includes a receiver configured to receive HARQ feedback for the first RS transmission. One or more HARQ feedback bits indicate a preferred latency. The apparatus includes at least one processor coupled with a memory and configured to select a second latency, for a second RS transmission using the configured resource set, based, at least in part, on the HARQ feedback.

Certain aspects provide an apparatus for wireless communication. The apparatus generally includes a receiver configured to receive signaling configuring the apparatus with one or more RS resource sets. Each of the one or more RS resource sets is associated with a first or second type of beam refinement procedure. The apparatus includes a transmitter configured to send an indication to a BS of at least a first latency and a second latency, longer than the first latency. The receiver is further configured to receive DCI triggering RS transmissions using a RS resource set associated with the second type of beam refinement procedure. The apparatus includes at least one processor coupled with a memory and configured to determine to monitor the RS transmissions at the first or second latency, with respect to the DCI.

Certain aspects provide an apparatus for wireless communication. The apparatus generally includes at least one processor coupled with a memory and configured to monitor a first RS transmission from a BS at a first latency with respect to DCI triggering the RS transmissions, using a configured RS resource set associated with a first or second type of beam refinement procedure. The apparatus includes a transmitter configured to send HARQ feedback for the first RS transmission including one or more HARQ feedback bits indicating a preferred latency. The at least one processor is further configured to monitor a second RS transmission from the BS at a second latency.

Certain aspects provide a computer readable medium having computer executable code stored thereon for wireless communication. The computer readable medium generally includes code for configuring a UE with one or more RS resource sets. Each of the one or more RS resource sets is associated with a first or second type of beam refinement procedure. The computer readable medium includes code for receiving an indication from the UE of at least a first latency and a second latency, longer than the first latency. The computer readable medium includes code for dynamically selecting, for each RS transmission using one of the configured resource sets, the first or second latency. The computer readable medium includes code for sending the RS transmissions at the selected latency with respect to DCI triggering the RS transmissions for the first or second type of beam refinement procedure.

Certain aspects provide a computer readable medium having computer executable code stored thereon for wireless communication. The computer readable medium generally includes code for sending a first RS transmission at a first latency with respect to DCI triggering the RS transmissions, using a configured RS resource set, for a first or second type of beam refinement procedure. The computer readable medium includes code for receiving HARQ feedback for the first RS transmission. One or more HARQ feedback bits indicate a preferred latency. The computer readable medium includes code for selecting a second latency, for a second RS transmission using the configured resource set, based, at least in part, on the HARQ feedback.

Certain aspects provide a computer readable medium having computer executable code stored thereon for wireless communication. The computer readable medium generally includes code for receiving signaling configuring a UE with one or more RS resource sets. Each of the one or more RS resource sets is associated with a first or second type of beam refinement procedure. The computer readable medium includes code for sending an indication to a BS of at least a first latency and a second latency, longer than the first latency. The computer readable medium includes code for receiving DCI triggering RS transmissions using a RS resource set associated with the second type of beam refinement procedure. The computer readable medium includes code for determining to monitor the RS transmissions at the first or second latency, with respect to the DCI.

Certain aspects provide a computer readable medium having computer executable code stored thereon for wireless communication. The computer readable medium generally includes code for monitoring a first RS transmission from a BS at a first latency with respect to DCI triggering the RS transmissions, using a configured RS resource set associated with a first or second type of beam refinement procedure. The computer readable medium includes code for sending HARQ feedback for the first RS transmission including one or more HARQ feedback bits indicating a preferred latency. The computer readable medium includes code for monitoring a second RS transmission from the BS at a second latency.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
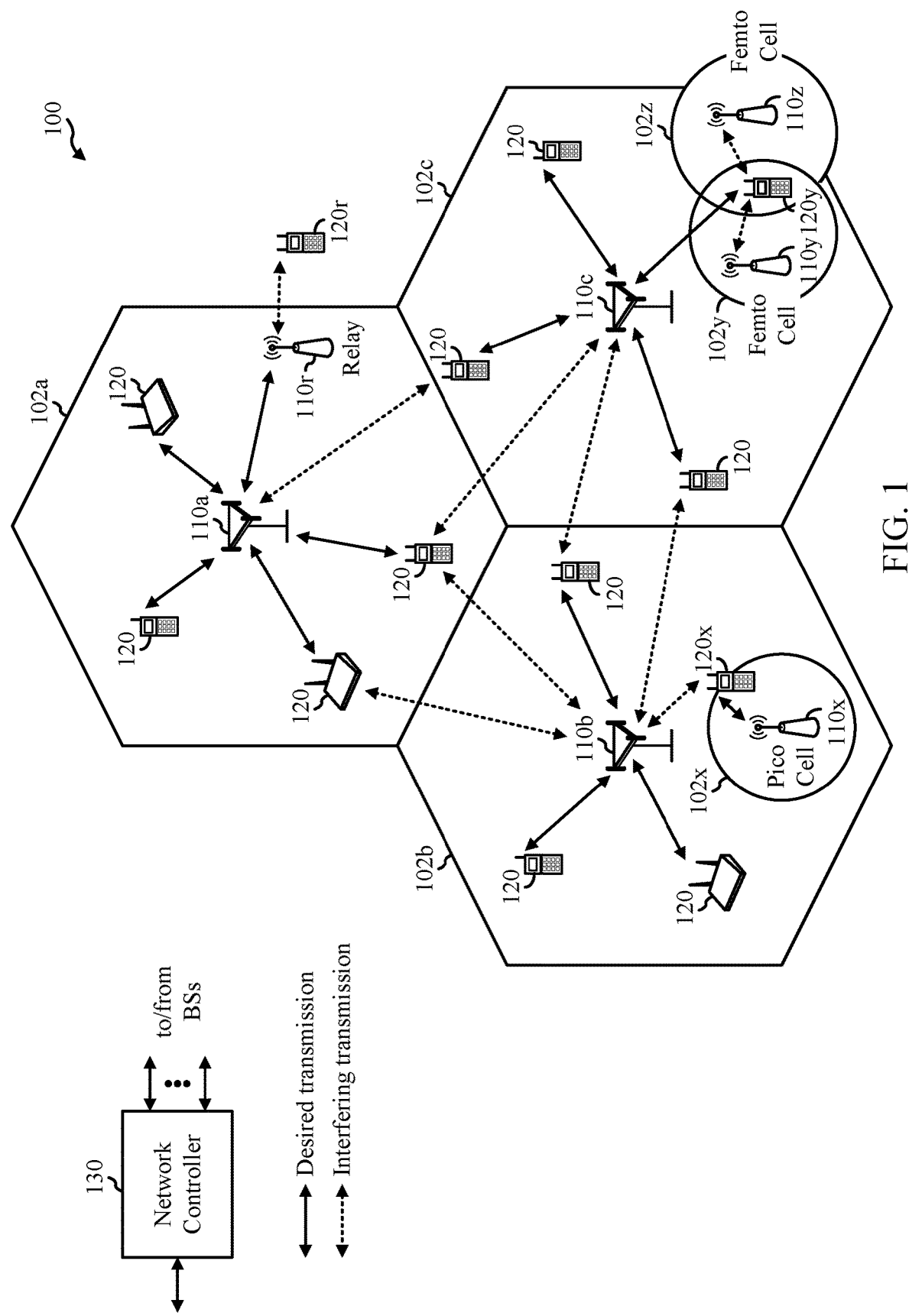
FIG. 1 is a block diagram conceptually illustrating an example telecommunications system, in accordance with certain aspects of the present disclosure.

Certain systems, such a millimeter wave (mmW) systems (e.g., in new radio technologies) use beamforming. Beamforming may include an initial beam pair procedure to identify/select a transmit beam at the base station (BS) and a receive beam at the user equipment (UE). Subsequent beam refinement procedures can be performed to update and/or optimize the selected beams. A UE may have multiple antenna modules (e.g., panels or arrays). To save power, some antenna modules at the UE can be ON (e.g., in an active or awake mode) while other antenna modules at the UE are OFF (e.g., in a low power or sleep mode). Some beam refinement procedures may train only antenna-modules/beams that are awake, and other beam refinement procedures may train antenna-modules/beams that are not awake. Thus, the UE may need to wake up or turn ON those antenna-modules for the beam refinement procedure. In these cases, the UE may need a longer latency between triggering of the procedure (e.g., by downlink control information (DCI) from the BS) and reception of the training reference signals (RS) used for the procedure (e.g., channel state information RS (CSI-RS)). In other cases, a shorter latency may be desirable.

Accordingly, techniques for the UE to signal latencies, recommended latencies, and/or preferred latencies and for the BS to dynamically select the appropriate latency for a particular RS transmission for a beam refinement procedure based on considerations at the BS and/or input from the UE are desirable.

Aspects of the present disclosure provide apparatus, methods, processing systems, and computer readable mediums for beam refinement procedures including dynamic signaling and/or selection of beam-switching latency for beam refinement procedures using inter- and/or intra-antenna module beam switching.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. The 5G wireless communication network 100 may use beamforming. A base station (BS) 110 and a user equipment (UE) 120 in the wireless communication network 100 may perform an initial beam pair selection procedure and subsequent beam refinement procedures to identify/select the best BS transmit beam and UE receive beam for communicating with each other. In some examples, the BS 110 configures the UE 120 with reference signal (RS) resource sets associated with the beam refinement procedures. The UE 120 can signal multiple latencies to the BS 110, for example, for the different beam refinement procedures. In some examples, the UE 120 signals a preferred latency to the BS 110. The BS 110 may dynamically select a latency to use for a RS transmission for a beam refinement procedure based on the type of beam refinement procedure, the input from the UE 120, and/or other considerations at the BS 110. The UE 120 can determine the latency used by the BS 110 so the UE 120 can monitor accordingly for RS transmissions from the BS 110 for a beam refinement procedure. The UE 120 may provide hybrid automatic repeat request (HARQ) feedback for RS transmissions from the BS 110. In some examples, the UE 120 indicates a preferred latency in the HARQ feedback signal.

As illustrated in FIG. 1, the wireless communication network 100 may include a number of base stations (BSs) 110 and other network entities. ABS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). ABS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
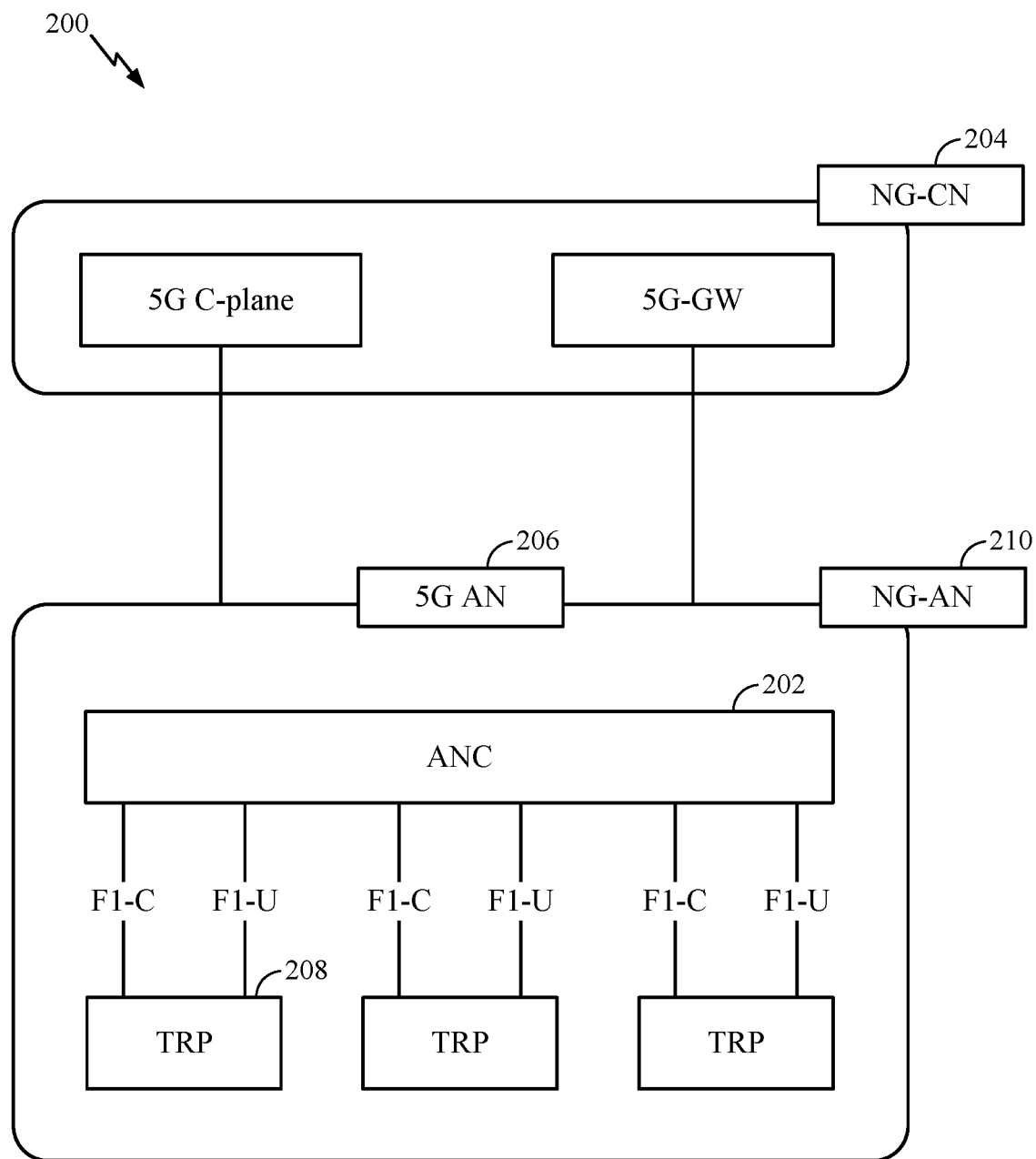
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an ANC 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
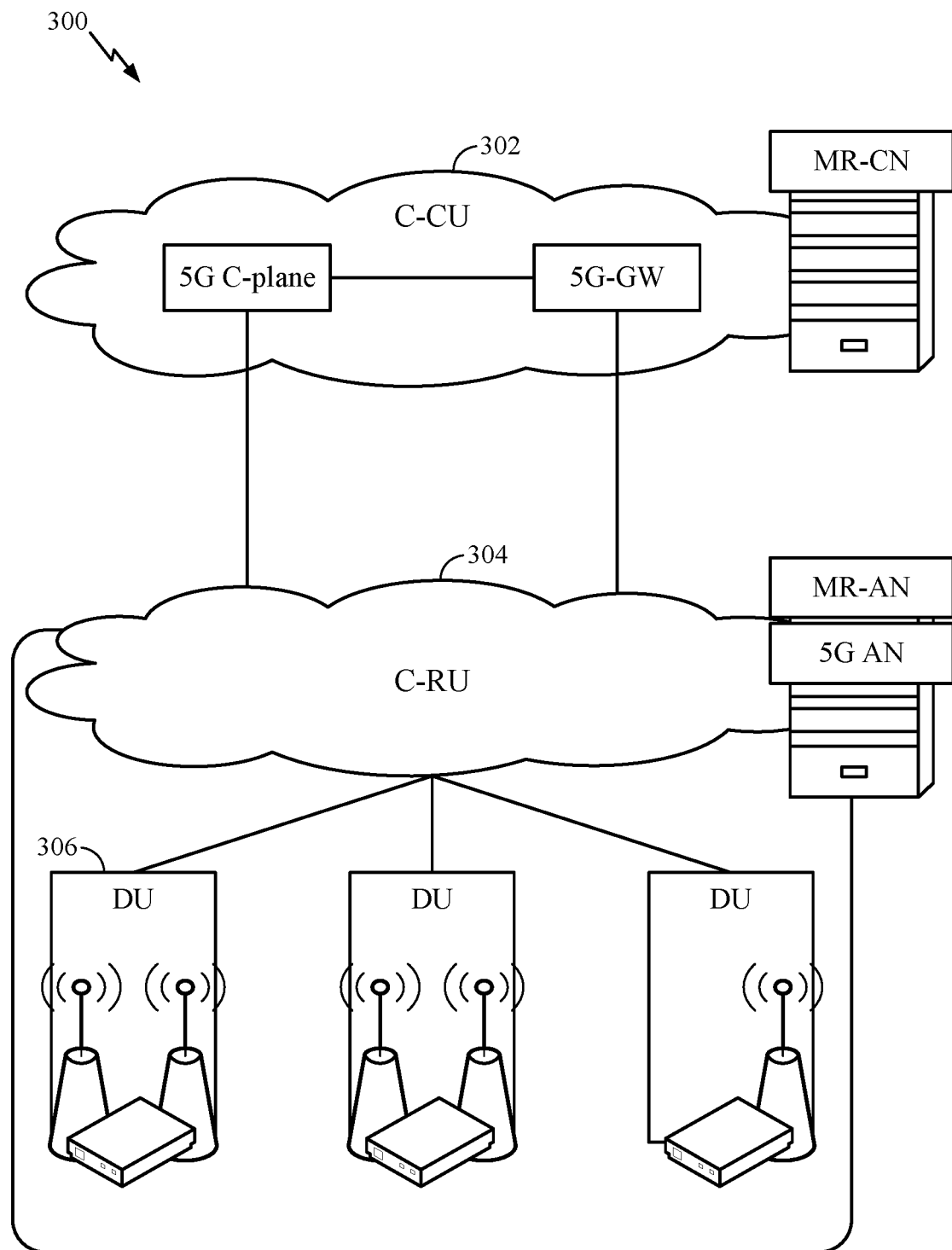
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
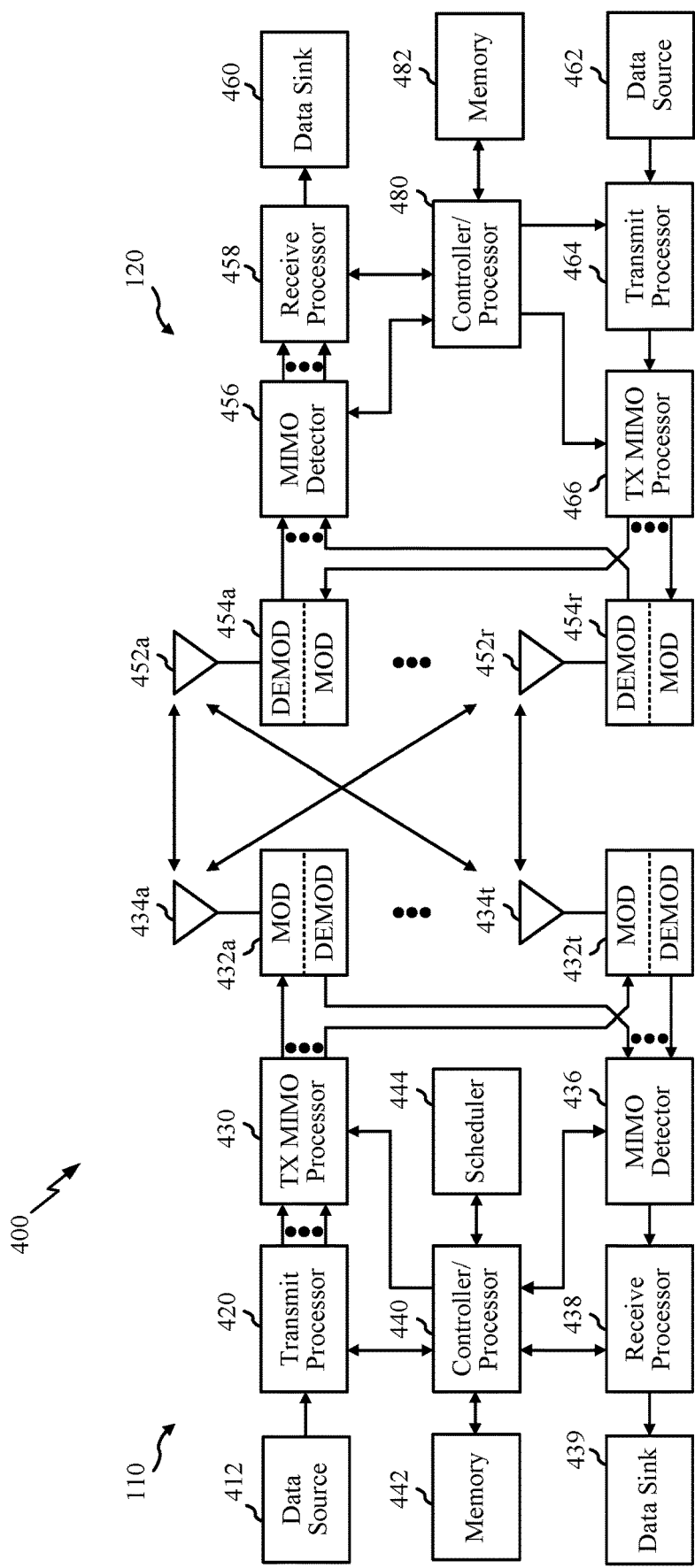
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for dynamically selecting latencies for beam refinement procedures.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The controller/processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
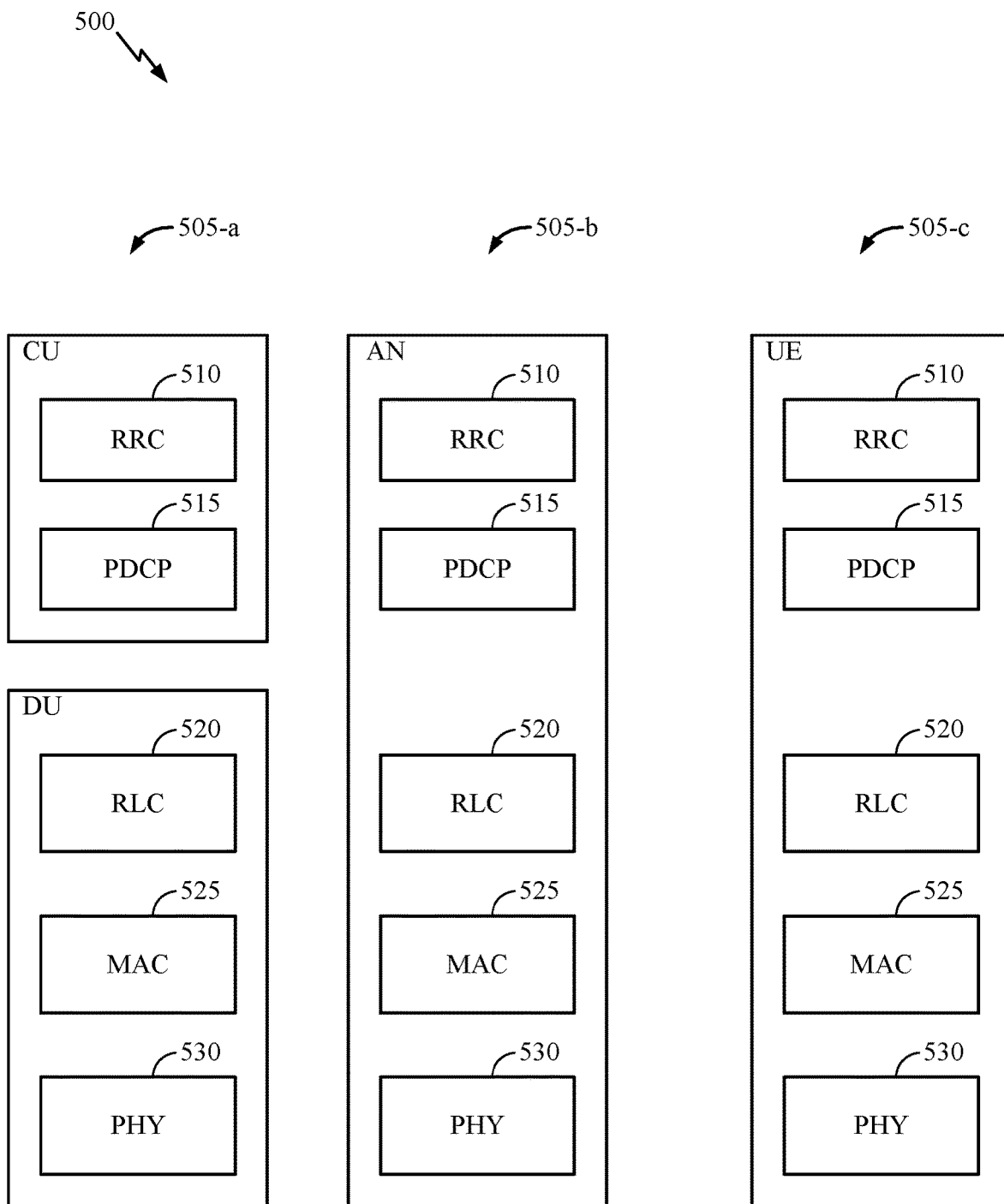
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., TRP 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
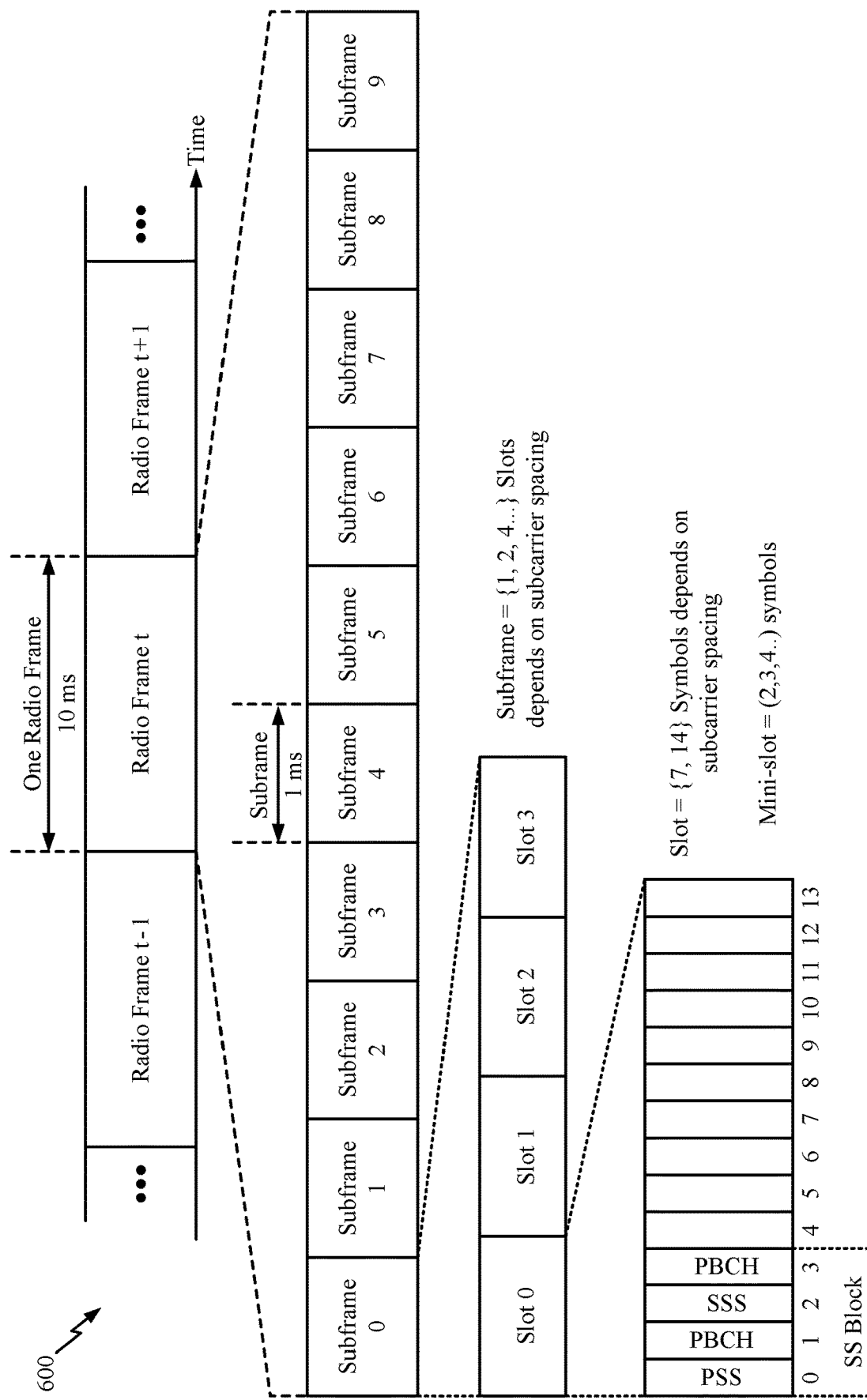
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information (SI), such as downlink system bandwidth, timing information within radio frame, SS burst set periodicity, system frame number, etc. The SS blocks may be organized into SS bursts to support beam sweeping.

Further system information such as, remaining minimum system information (RMSI), system information blocks (SIBs), other system information (OSI) can be transmitted on a PDSCH in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Procedures

As discussed above, in millimeter wave (mmW) cellular systems, beam forming may be used to overcome high path-losses. As described herein, beamforming may include establishing a communication link between a BS and UE, such as a BS 110 and UE 120 in the wireless communication network 100. Both the BS and the UE can find and select at least one adequate beam to form the communication link. The selected BS-beam and the UE-beam form what is referred to as a beam pair link (BPL). As an example, on the downlink, the BS uses a transmit beam to send a downlink transmission and the UE uses a receive beam to receive the downlink transmission. The combination of the transmit beam and the corresponding receive beam form the BPL. At least one BPL is established for network access. Different BPLs may be used for different channels, for communicating with different BSs, or as fallback BPLs in case an existing BPL fails.

As a part of beam management, beams which are used by the BS and UE are refined from time to time because of changing channel conditions. For example, channel conditions can change due to movement of the UE or other objects, and/or fading due to Doppler spread. Because the channel conditions can change over time, the BPL should be periodically updated or refined.

Figure 7A:
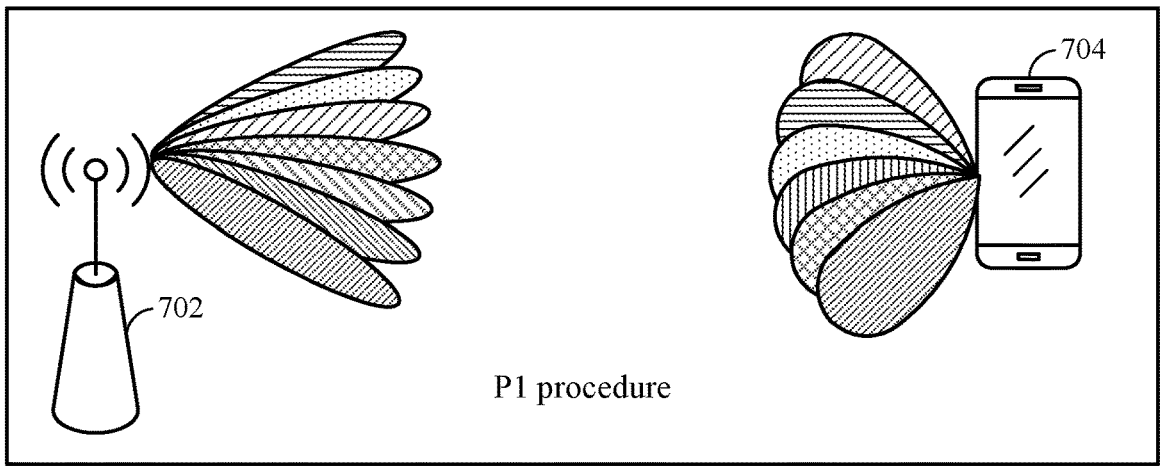
FIG. 7A illustrates an initial beam training procedure, in accordance with certain aspects of the present disclosure.
Figure 7B:
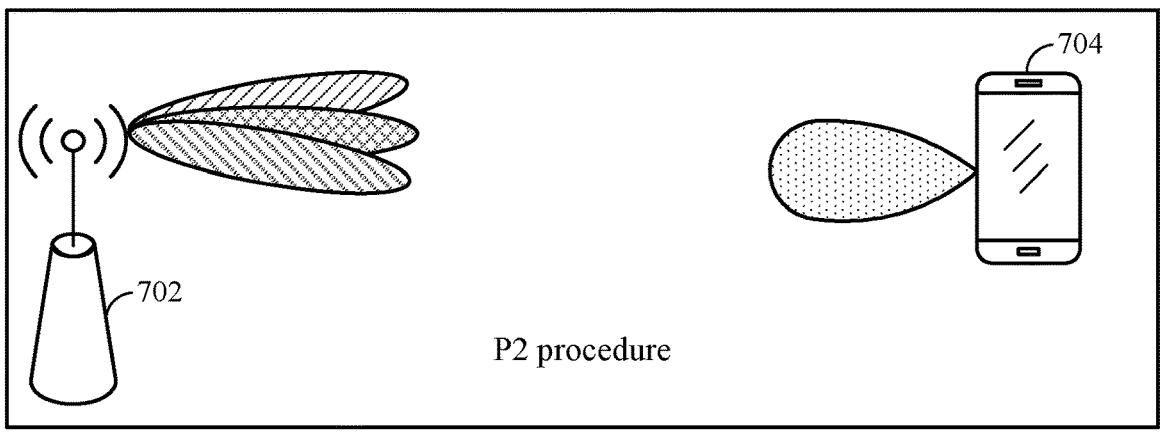
FIG. 7B illustrates a BS transmit beam refinement procedure, in accordance with certain aspects of the present disclosure.
Figure 7C:
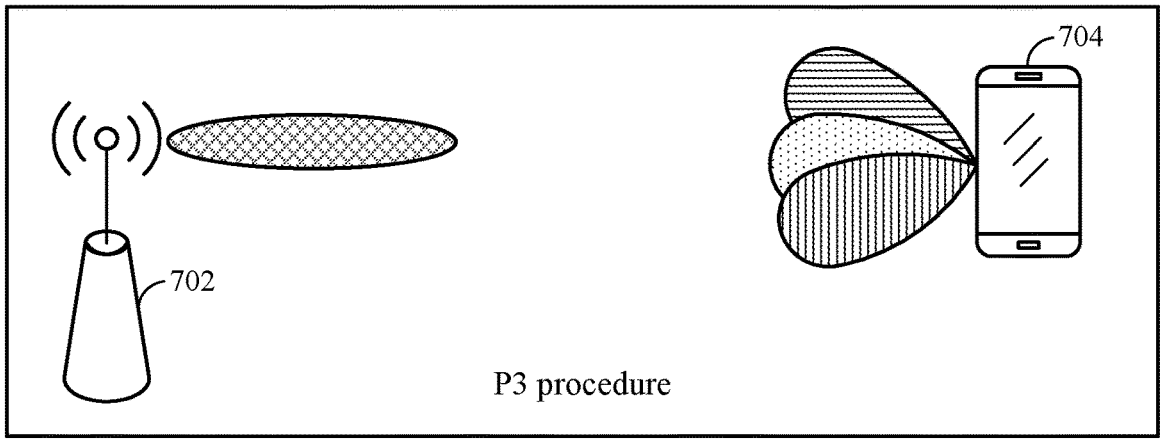
FIG. 7C illustrates a UE receive beam refinement procedure, in accordance with certain aspects of the present disclosure.

FIG. 7A illustrates an example beam management procedure for BPL discovery and FIG. 7B and FIG. 7C illustrate example beam management procedures for BPL refinement. In certain systems (e.g., 5G-NR), a P1 procedure is used for BPL discovery, and P2 and P3 procedures are used for BPL refinement. The network uses a P1 procedure to enable the discovery of new BPLs. In the P1 procedure 700A, as illustrated in FIG. 7A, the BS 702 transmits different symbols of a reference signal, each beam formed in a different spatial direction such that several (most, all) relevant places of the cell are reached. In other words, the BS transmits beams using different transmit beams (e.g., swept) over time in different directions.

The UE 704 finds an appropriate receive beam for successful reception of at least one symbol of the "P1-signal" transmitted by the BS 702. To find an appropriate receive beam, the UE 704 searches using available receive beams and applying a different UE receive beam (e.g., swept) during each occurrence of the periodic P1-signal. Once the UE 704 has succeeded in receiving a symbol of the P1-signal, it has discovered a BPL (i.e., the transmit and receive beams used in the symbol the P1-signal was successfully received). Once find a BPL, the UE 704 may not wait until it has found the best UE receive beam, since this may delay further actions. The UE 704 may measure the reference signal receive power (RSRP) and report the symbol index together with the RSRP to the BS. The UE 704 may report the findings (e.g., the RSRP and beam index) of one BPL or multiple BPLs. The UE 704 may not know which beam the BS 702 used to transmit the signal; however, the UE 704 may report to the BS 702 the time at which it observed the signal having a high RSRP and the BS 702 can determine which transmit beam the BS 702 used at the reported time.

After the P1 procedure to identify the BPL(s). The P2 and P3 procedures can be used to refine an individual BPL. The P2 procedure 700B is performed to refine the BS transmit-beam of the BPL. As shown in FIG. 7B, the BS 702 transmits a few symbols of the RS using different BS transmit-beams. The BS transmit beams used during the P2 procedure 700B may be different from those used during the P1 procedure 700A. For example, the BS transmit beams used during the P2 procedure 700B may be spaced closer together, or more focused, than the beams used during the P1 procedure 700A. The different BS transmit beams may be spatially close to the BS transmit-beam of the BPL. For example, the BS 702 may perform a beam sweep using neighboring BS transmit beams around the selected BS transmit beam of current BPL. The UE 704 keeps its receive beam constant during the P2 procedure 700B (e.g., the receive beam in the current BPL). The UE 704 measures the signal quality, such as the RSRP, for the various BS transmit beams used during the P2 procedure 700B and indicates the best (e.g., strongest) BS transmit beam to the BS 702. The BS 702 may then switch to the indicated best BS transmit beam for the BPL, thus, refining the BS transmit beam used for the BPL.

The P3 procedure 700C may be performed to refine the UE receive beam of the BPL. As shown in FIG. 7C, the BS transmit beam stays constant (i.e., the BS 702 transmits the RS in the symbols using the same BS transmit beam) and the UE 704 scans using different UE receive beams. For example, the UE 704 may perform a beam sweep using neighboring beams of the UE receive beam in the current BPL. The UE 704 may measure the signal quality, such as the RSRP, for the various UE receive beams and identify the best (e.g., strongest) UE receive beam. The UE 704 may then use the identified best UE receive beam for the BPL and may report the RSRP and beam index to the BS 702, thus refining the UE receive beam used for the BPL.

Over time, the BS and UE establish several BPLs. When the BS transmits a certain channel (e.g., PDSCH, PDCCH, PUSCH, PUCCH) or signal (e.g., SRS, CSI-RS), the BS informs the UE which BPL will be involved, such that the UE may tune in the direction of the correct UE receive beam before the signal starts. In this manner, every sample of that signal or channel may be received by the UE using the correct receive beam). In NR this information may be referred to as quasi co-location (QCL) information. Antenna ports are QCL'd if properties of the channel over which a symbol on one antenna port is conveyed may be inferred from the channel over which a symbol on the other antenna port is conveyed. QCL supports at least beam management functionality, frequency/timing offset estimation functionality, and radio resource management (RRM) management functionality.

Example Dynamic Beam-Switching Latency for Beam Refinement Procedures

As described above, certain systems, such a millimeter wave (mmW) systems (e.g., as in new radio technologies such as 5G NR), use beamforming. Beam management includes finding and refining beam pair links (BPLs), such as by using the beam management procedures, such as the P1, P2, and/or P3 procedures described above with respect to FIGS. 7A-7C.

Figure 8:
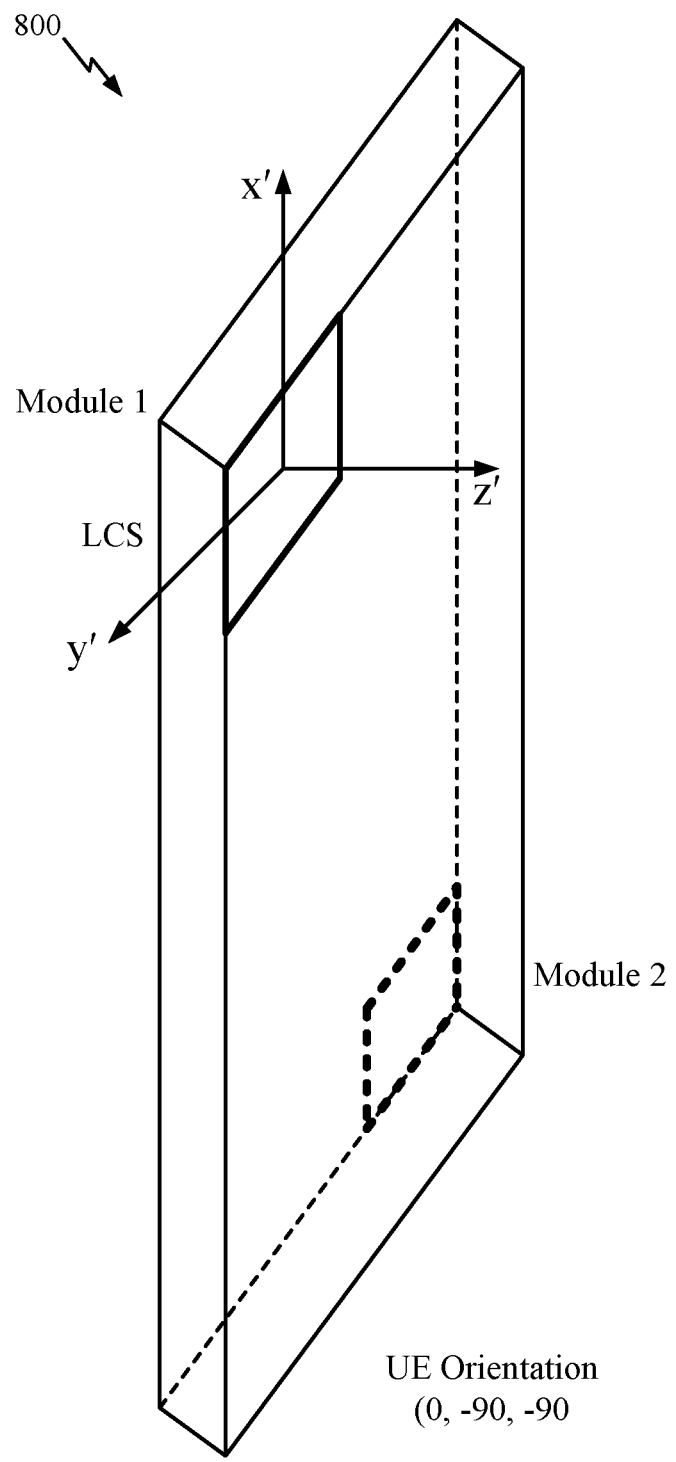
FIG. 8 illustrates an example UE with multiple antenna modules, in accordance with certain aspects of the present disclosure.

A user equipment (UE) may have multiple antenna modules (e.g., antenna panels). Each antenna module has at least one antenna array for beamforming. For example, the UE 800 shown in FIG. 8 includes the antenna module 1 and the antenna module 2 (on the opposite side of the UE 800). To save power, the UE 800 may only keep one or some antenna modules in wakeup (e.g., in an "ON", powered up, active state) while keeping other antenna modules in sleep (e.g., in an "OFF", low power, or powered off state). FIG. 8 is only one illustrative examples, a UE may more than 2 antenna modules, which may be at different locations on the UE 800.

Figure 9:
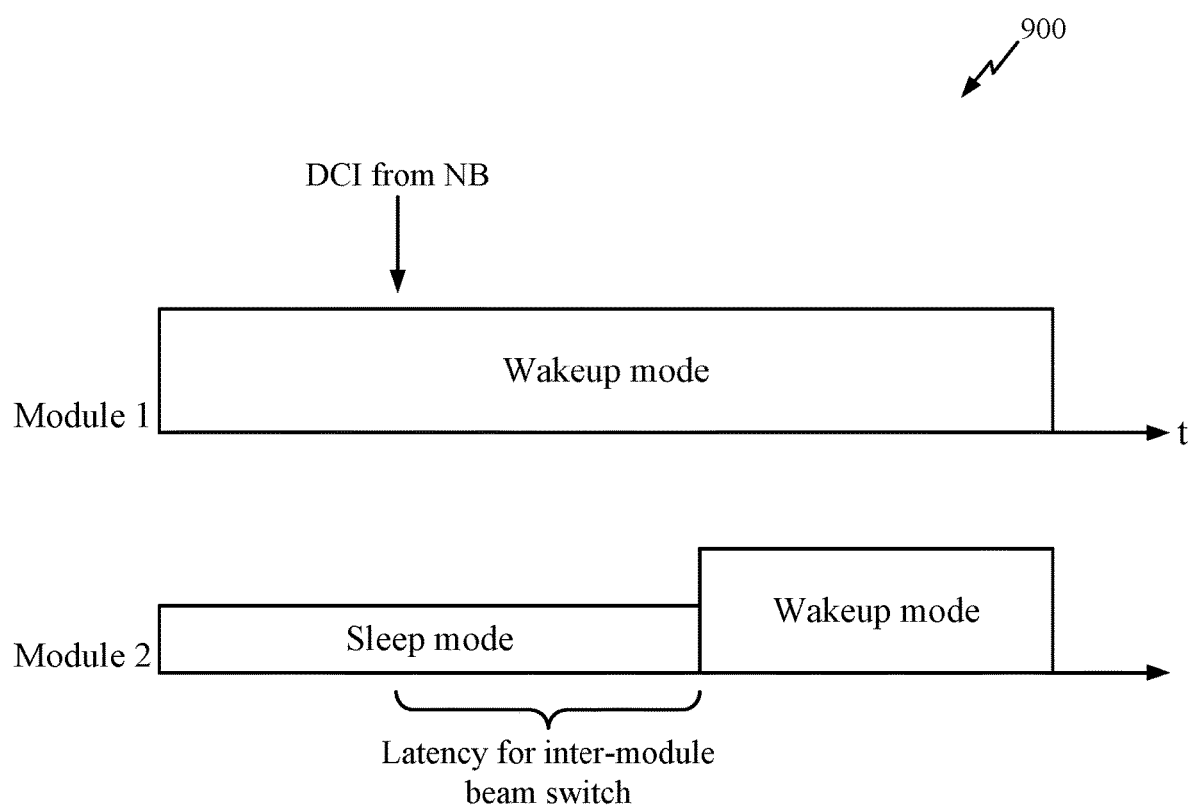
FIG. 9 illustrates example inter-antenna module beam switching, in accordance with certain aspects of the present disclosure.

Some beam refinement procedures may train only antenna-modules that are awake. For example, in the P2 procedure 700B the UE uses the same UE receive beam. In another example, in the P3 procedure 700C, the training may be for only intra-antenna modules or for only antenna modules that are already awake. Other beam refinement procedures may train antenna-modules that are in sleep. For example, for the inter-antenna module P3 procedure 700C. Thus, the UE may need to wake up some antenna-modules for some beam refinement procedures. As shown in FIG. 9, the UE may use a longer latency between triggering of the procedure (e.g., by downlink control information (DCI) from the base station (BS)) and reception of training reference signals (RS) used for the procedure (e.g., a periodic channel state information RS (A-CSI-RS)), as compared to beam refinement procedures where the UE does not need to wake up any antenna-modules. However, in some cases, a shorter latency may be desirable, even for the P3 procedure.

The BS (e.g., a next generation Node B (gNB)) can configure the UE with RS resource sets, such as CSI-RS resource sets, for the beam refinement procedures. The configuring may be by radio resource control (RRC) signaling. The configured RS resource sets may be associated with different types of beam refinement procedures. For example, a flag (e.g., called the CSI-RS-ResourceRep) in the RRC signaling configuring the RS resource set indicates whether the RS resource set is associated with a beam refinement procedure in which the BS does not repeat (e.g., CSI-RS-ResourceRep=OFF) the trigger resource (e.g., such as in the P2 procedure) or the repeats (e.g., CSI-RS-ResourceRep=ON) the triggered resource using the same BS transmit beam (e.g., such as the P3 procedure). For the RS resource sets associated with the first type of beam refinement procedure the UE measures those resources in the active antenna module, while for the second type of beam refinement procedure the UE measures those resources with different UE receive beam across multiple modules including those in sleep.

Figure 10:
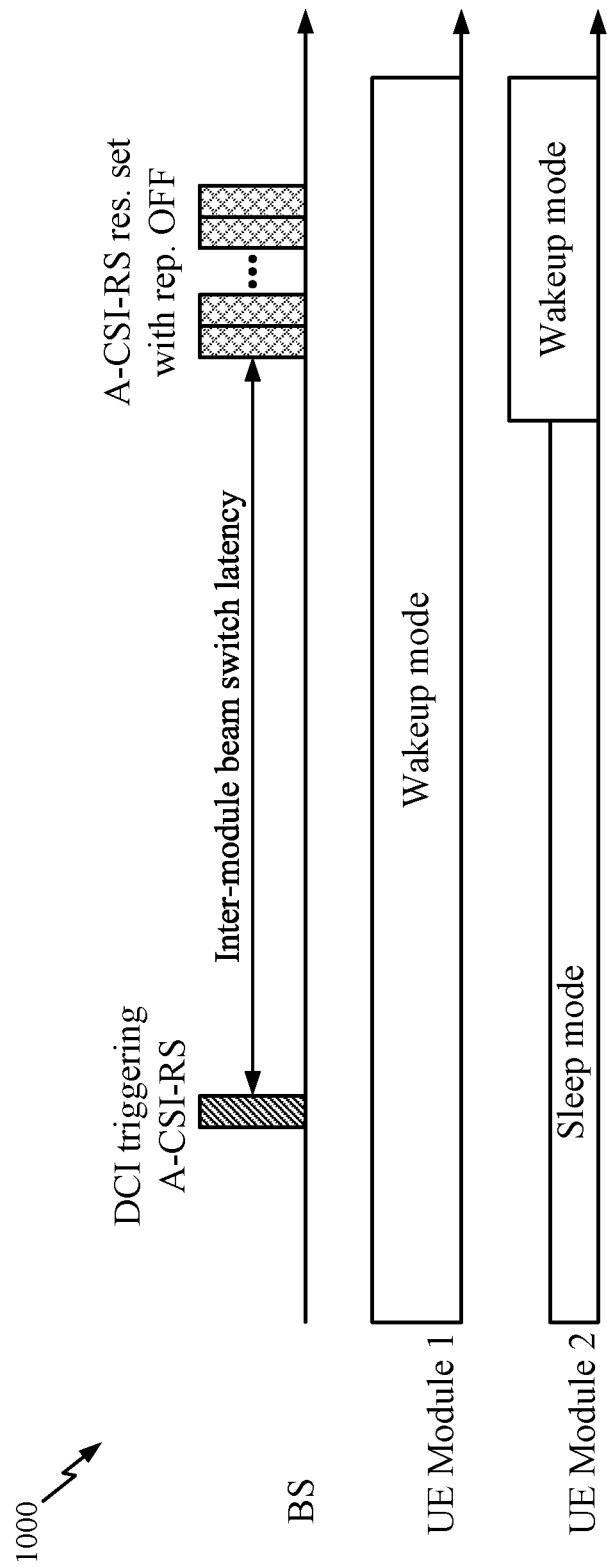
FIG. 10 illustrates example intra-antenna module beam switching using an unnecessarily long latency, in accordance with certain aspects of the present disclosure.

In some examples, the UE signals a fixed beam switch latency (i.e., the latency from the DCI to the triggered RS resources) to the BS. For example, the UE may signal the longer latency needed to for the antenna-module wakeup (e.g., around 3 ms). The BS then uses the longer latency for all trigger RS resources as shown in FIG. 10. However, in some cases the longer latency may be unnecessarily long. For example, for intra-antenna module beam refinement procedures, such as the P2 procedure (e.g., with CSI-RS-ResourceRep=OFF), the BS applies the longer latency although the UE does not need wake up any antenna-modules, thus introducing unnecessary and additional delay to the procedure.

Figure 11:
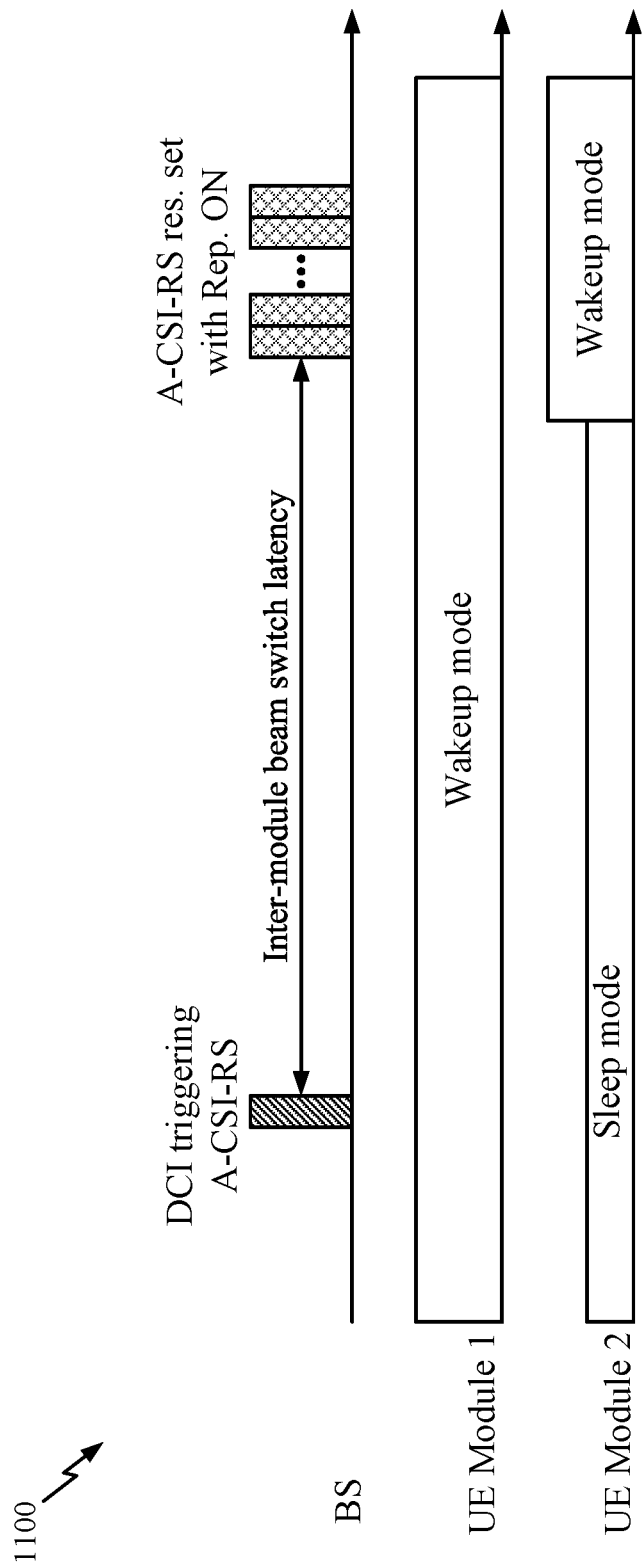
FIG. 11 illustrates another example intra-antenna module beam switching using an unnecessarily long latency, in accordance with certain aspects of the present disclosure.

In some examples, instead of signaling one fixed beam switch latency, the UE signals two fixed beam switch latencies to the BS. For example, the UE signals a first latency associated with the P2 procedure (e.g., with CSI-RS-ResourceRep=OFF) and a second, longer, latency associated with the P3 procedure (e.g., with CSI-RS-ResourceRep=ON). However, as mentioned above, in some cases the longer latency may be unnecessarily long. For example, sometimes the UE does not perform inter-antenna module beam switching even for the P3 procedure, as shown in FIG. 11, such as when a fast training is preferred and/or when the current antenna module (e.g., the current BPL) has good channel quality (e.g., the channel quality satisfies a threshold). In another example, the UE does perform inter-antenna module switching for the P3 procedure, but the antenna modules used are all already in wakeup mode and, therefore, the longer threshold would be inefficient.

Accordingly, techniques for the UE to signal latencies, recommended latencies, and/or preferred latencies and for the BS to dynamically select the appropriate latency for a particular RS transmission for a beam refinement procedure based on considerations at the BS and/or input from the UE are desirable.

Aspects of the present disclosure provide apparatus, methods, processing systems, and computer readable mediums for beam refinement procedures including dynamic signaling and/or selection of beam-switching latency for beam refinement procedures using inter- and/or intra-antenna module beam switching.

Figure 12:
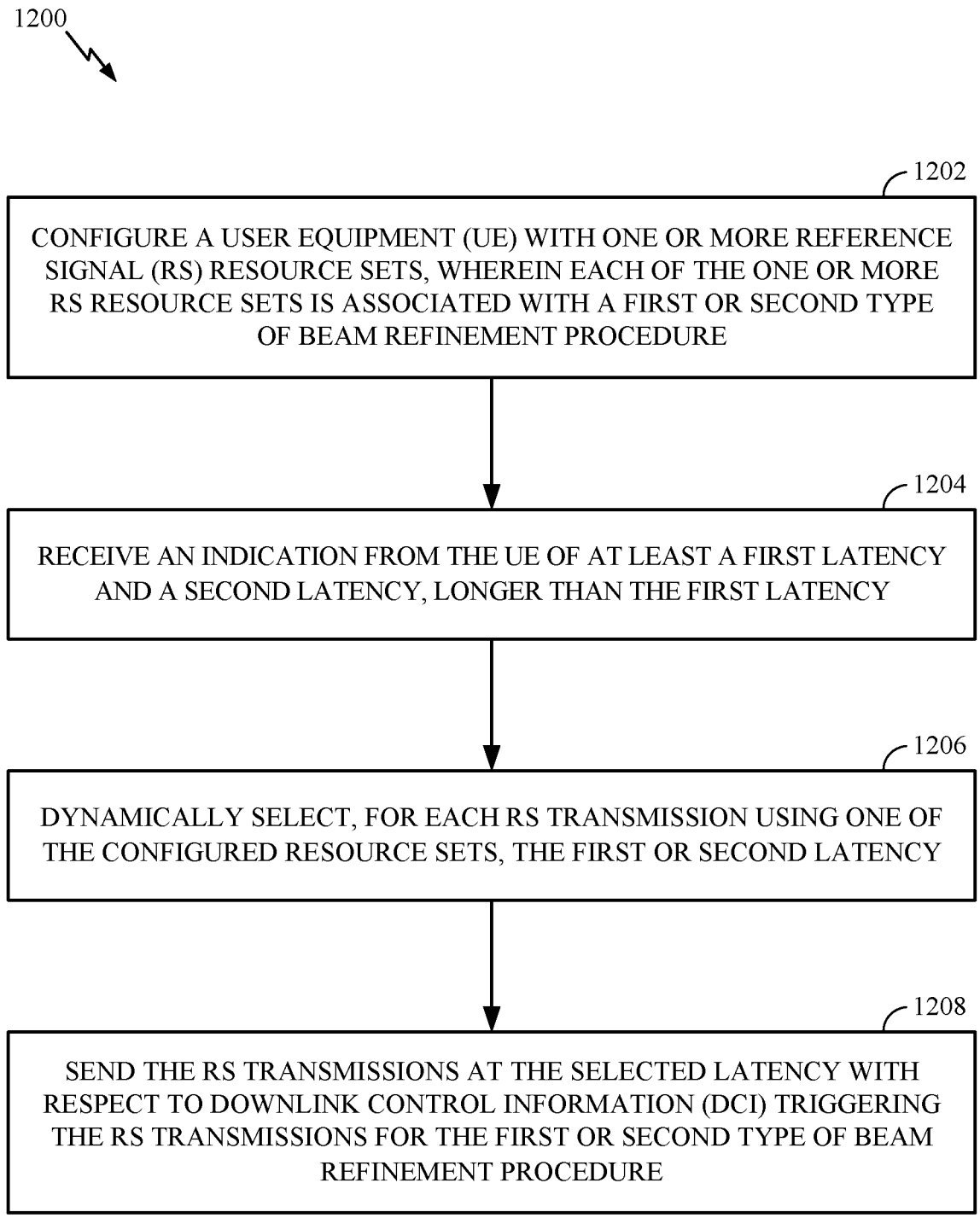
FIG. 12 illustrates example operations by a BS for beam refinement procedure using a dynamically selected latency, in accordance with certain aspects of the present disclosure.

FIG. 12 illustrates example operations 1200 for beam refinement procedures using a dynamically selected latency, in accordance with certain aspects of the present disclosure. Operations 1200 may be performed, for example, by a BS (e.g., such as a BS 110 in the wireless communication network 100). Operations 1200 may be implemented as software components that are executed and run on one or more processors (e.g., controller/processor 440 of FIG. 4). Further, the transmission and reception of signals by the BS in operations 1200 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

Operations 1200 begin, at 1202, by configuring a UE with one or more RS resource sets (e.g., A-CSI-RS). Each of the one or more RS resource sets is associated with a first (e.g., P2 or intra-antenna module) or second type (e.g., P3 or inter-antenna module) of beam refinement procedure. At 1204, the BS receives an indication from the UE of at least a first latency and a second latency, longer than the first latency. At 1206, the BS dynamically selects, for each RS transmission using one of the configured resource sets, the first or second latency. As described in more detail below, the selection at 1206 may be based on an indication from the UE of a preferred latency, which type of beam refinement procedure is being performed, whether fast training is preferred, and/or a current signal quality with the current BPL. At 1208, the BS sends the RS transmissions at the selected latency with respect to DCI triggering the RS transmissions for the first or second type of beam refinement procedure.

Figure 13:
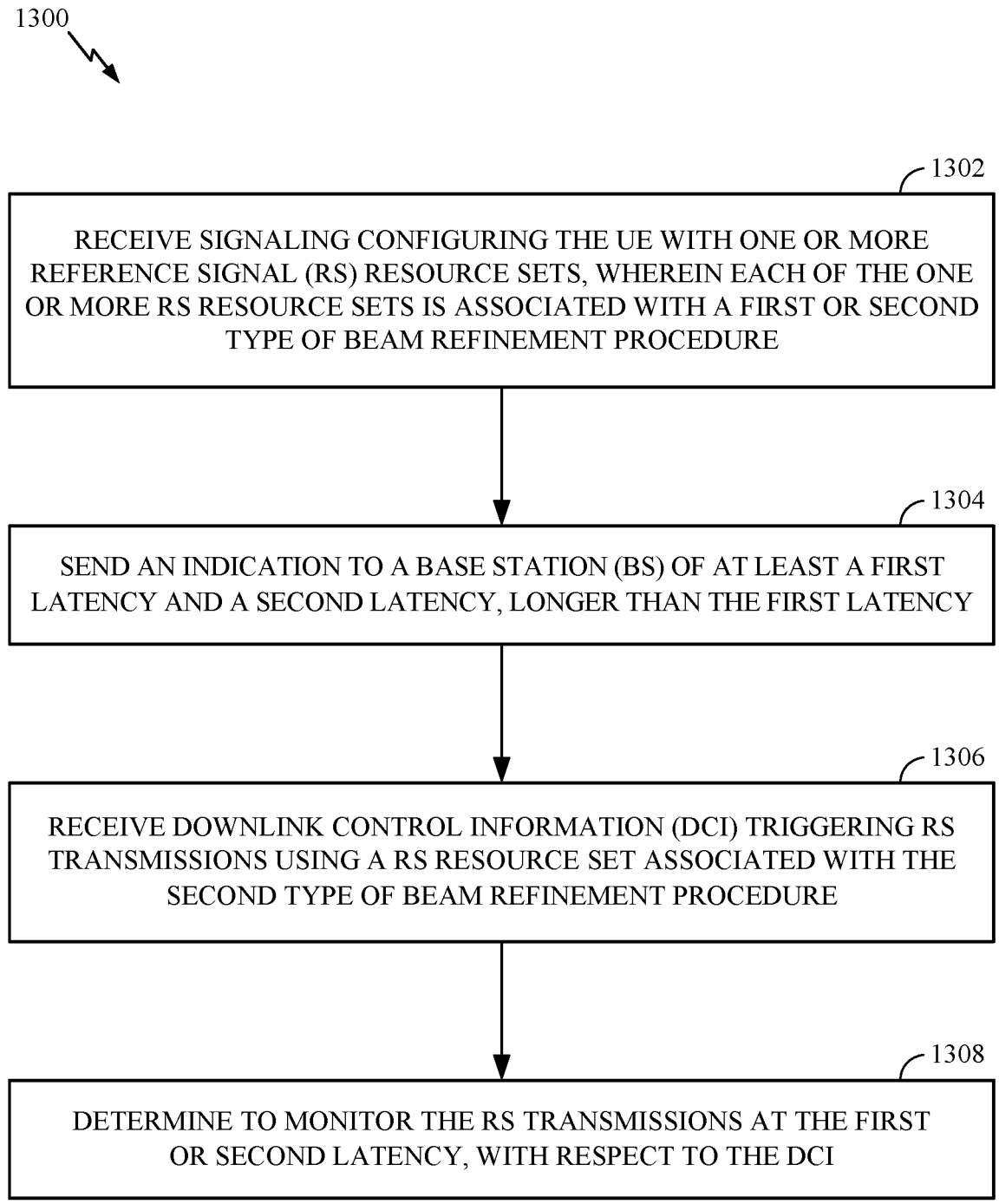
FIG. 13 illustrates example operations by a UE for signaling latencies and determining monitoring latencies for a beam refinement procedure, in accordance with certain aspects of the present disclosure.

FIG. 13 illustrates example operations 1300 for signaling latencies and determining monitoring latencies for a beam refinement procedure, in accordance with certain aspects of the present disclosure. Operations 1300 may be performed, for example, by a UE (e.g., such as a UE 120 in the wireless communication network 100). Operations 1300 may be complementary to the operations 1200 performed by the BS. Operations 1300 may be implemented as software components that are executed and run on one or more processors (e.g., controller/processor 480 of FIG. 4). Further, the transmission and reception of signals by the UE in operations 1300 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

Operations 1300 begin, at 1302, by receiving signaling configuring the UE with one or more RS resource sets. Each of the one or more RS resource sets is associated with a first or second type of beam refinement procedure. At 1304, the UE sends an indication to a BS of at least a first latency and a second latency, longer than the first latency. At 1306, the UE receives DCI triggering RS transmissions using a RS resource set associated with the second type of beam refinement procedure. At 1308, the UE determines to monitor the RS transmissions at the first or second latency, with respect to the DCI.

In some examples, the BS configures the UE at 1202, and the UE receives signaling configuring the UE at 1302, with the RS resource sets via RRC signaling. The RRC signaling may include an indication of the first or second type of beam refinement procedure associated with the configured RS resource sets. The first type of beam refinement procedure may be a P2 procedure in which the BS repeats the RS transmission to the UE over a plurality of symbols using different BS transmit beams. The UE measures the repeated RS transmissions with UE receive beams in a same panel and sends an indication to the BS of at least one BS transmit beam of the different BS transmit beams. The UE may send an indication to the BS of signal quality associated with at least one BS transmit beams of the different BS transmit beams. The second type of beam refinement procedure may be a P3 procedure in which the BS repeats the RS transmission to the UE over a plurality of symbols using a same BS transmit beam. The UE measures the repeated RS transmissions with UE receive beams in different panels and sends an indication to the BS of at least one UE receive beam or signal quality associated with the at least one UE receive beam. In some examples, the different panels include both active and idle panels when triggered by the DCI.

Example Dynamic Latency Selection

Aspects of the present disclosure allow the BS to dynamically select the latency for each RS transmission. In some examples, the UE signals at 1304, and the BS receives at 1204, two latencies. For example, the UE may signal a first latency associated with the P2 beam refinement procedure and a second, longer, latency for the P3 beam refinement procedure. In some examples, the two latencies may be recommended values. In some examples, only the longer latency may be a recommended value. For example, in the selection at 1206, the BS may select the first (shorter) latency, even for the P3 beam refinement procedure. The BS may select the first (shorter) latency for the P2 beam refinement procedure.

In some examples, once the BS dynamically selects the latency for the RS transmission of the corresponding beam refinement procedure after the first DCI, the BS's decision is fixed. In that case, the BS may continue to use the fixed latency for subsequent DCIs scheduling a corresponding beam refinement procedure. In this case, after receiving the first DCI at 1306, to determine the latency to monitor at 1308, the UE may wake up at both the shorter and longer latencies to check for the RS transmission to determine which latency was selected by the BS. Because the latency is fixed, once the UE determines the latency used by the BS, the UE continues to monitor at the detected latency after subsequent DCIs scheduling the corresponding beam refinement procedure.

In another example, after receiving the first DCI at 1306, to determine the latency to monitor at 1308, the UE may first wake up at the longer latency to check for the RS transmission to determine if longer latency was selected by the BS. If no RS transmission is detected (e.g., the UE missed the RS that was transmitted at the shorter latency selected by the BS), then the UE determines the shorter latency was selected by the BS and monitors at the shorter latency after subsequent DCIs.

According to certain aspects, at 1304 the UE signals, and the BS receives at 1204, two fixed beam switch latencies—a first latency for intra-antenna module beam switching and a second latency for inter-antenna module beam switches. The corresponding beam refinement procedures are classified as intra-module and inter-module beam refinements, which require intra-module and inter-module beam switches and, hence, use the first and second latencies, respectively. Both intra- and inter-module beam refinements may be applied to both P2 and P3 beam refinement procedures.

The BS dynamic selects the latency at 1206. For example, the BS may select the latency corresponding to the intra-antenna module latency, even for P3, such as when fast training is preferred and/or the active module (e.g., the current beam pair or BPL) has good channel quality (e.g., based on the latest channel quality indicator (CQI) report from the UE).

According to certain aspects, the BS dynamically indicates to the UE which latency is selected/used. For example, the BS may indicate in DCI triggering the RS resource set for a beam refinement procedure, the selected latency the BS will use for the RS transmissions (e.g., the latency of the RS transmission with respect to the triggering DCI). The UE can determine at 1308, to monitor according to the indicated latency. As another example, the BS may indicate in MAC-CE or RRC message the selected latency per beam refinement procedure.

According to certain aspects, the BS can take into account a UE preferred latency in the dynamically selection at 1206. In some examples, the UE transmits a request to the UE for the preferred latency. The UE may provide the indication of the UE preferred latency in response to receiving the request.

The BS may configure the UE to report the preferred latency via any uplink signal, which may include a periodic physical uplink control channel (PUCCH) transmission, a semi-persistent PUCCH, an aperiodic PUCCH transmission, and/or an aperiodic physical uplink shared channel (PUSCH) transmission. The reporting can be enabled by an RRC flag associated with the configured resource. Reporting via the semi-persistent PUCCH, aperiodic PUCCH, and/or aperiodic PUSCH also can be enabled by the medium access control (MAC) control element (CE) activating the configured transmission. Reporting via the aperiodic PUCCH and/or PUSCH also can be enabled by the DCI scheduling the configured resource.

In some examples, the UE autonomously reports the preferred latency. The UE can autonomously report the preferred latency in an uplink signal, such as in the periodic PUCCH, semi-persistent PUCCH, aperiodic PUCCH, and/or aperiodic PUSCH. The UE may indicate that the preferred latency report is included in the uplink signal. For example, the UE can indicate that the preferred latency is included in the signal by the PUCCH/PUSCH format used for the signal or by a flag in the signal.

The BS may select the reported UE preferred latency at 1206. The UE may indicate the last reported UE preferred latency in the DCI and the UE may determine, at 1308, to monitor at the preferred latency based on the indication from the BS.

Example Latency Selection Based on HARQ Feedback

Figure 14:
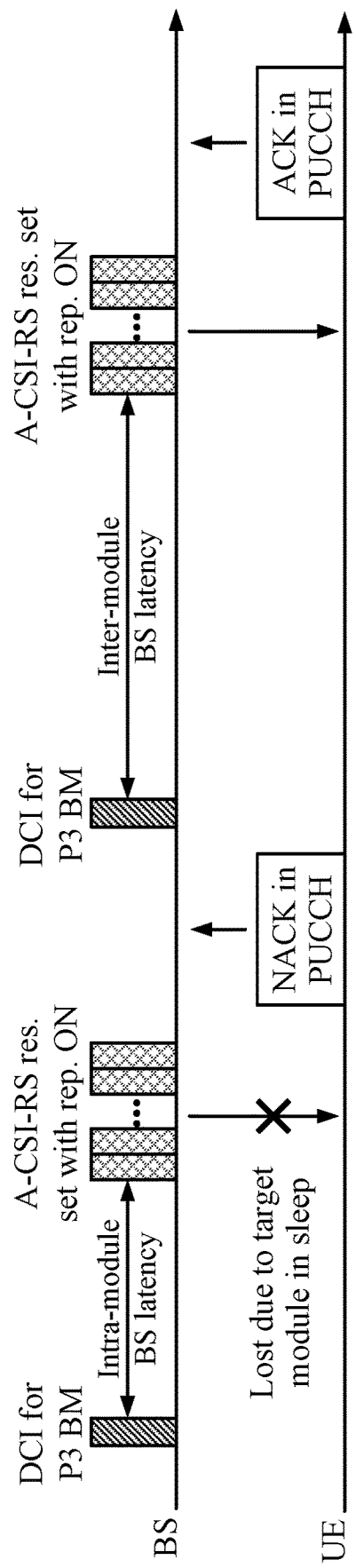
FIG. 14 illustrates example latency for a beam refinement procedure based on hybrid automatic repeat request (HARQ) feedback signaling, in accordance with certain aspects of the present disclosure.

In some examples, the UE signals two latencies to the BS for intra-antenna module beam switching and inter-antenna module beam switching. The BS can use a trial-and-error approach to select the latency to use for a beam refinement procedure with the UE. For example, the BS may blindly send the RS transmission using either the shorter or the longer latency. As shown in FIG. 14, the UE provides hybrid automatic repeat request (HARQ) feedback (e.g., in the PUCCH) indicating whether the RS transmission was successfully received. If the UE feeds back an acknowledgement (ACK), for example when the UE receives the RS transmission using the indicated latency, then the BS may continue to use the same latency. If the UE feeds back a negative acknowledgment (NACK), for example because the latency used by the BS was too short and the RS transmission was missed due to the target antenna module being in sleep mode, then the BS may send the RS transmission using the other latency.

Figure 15:
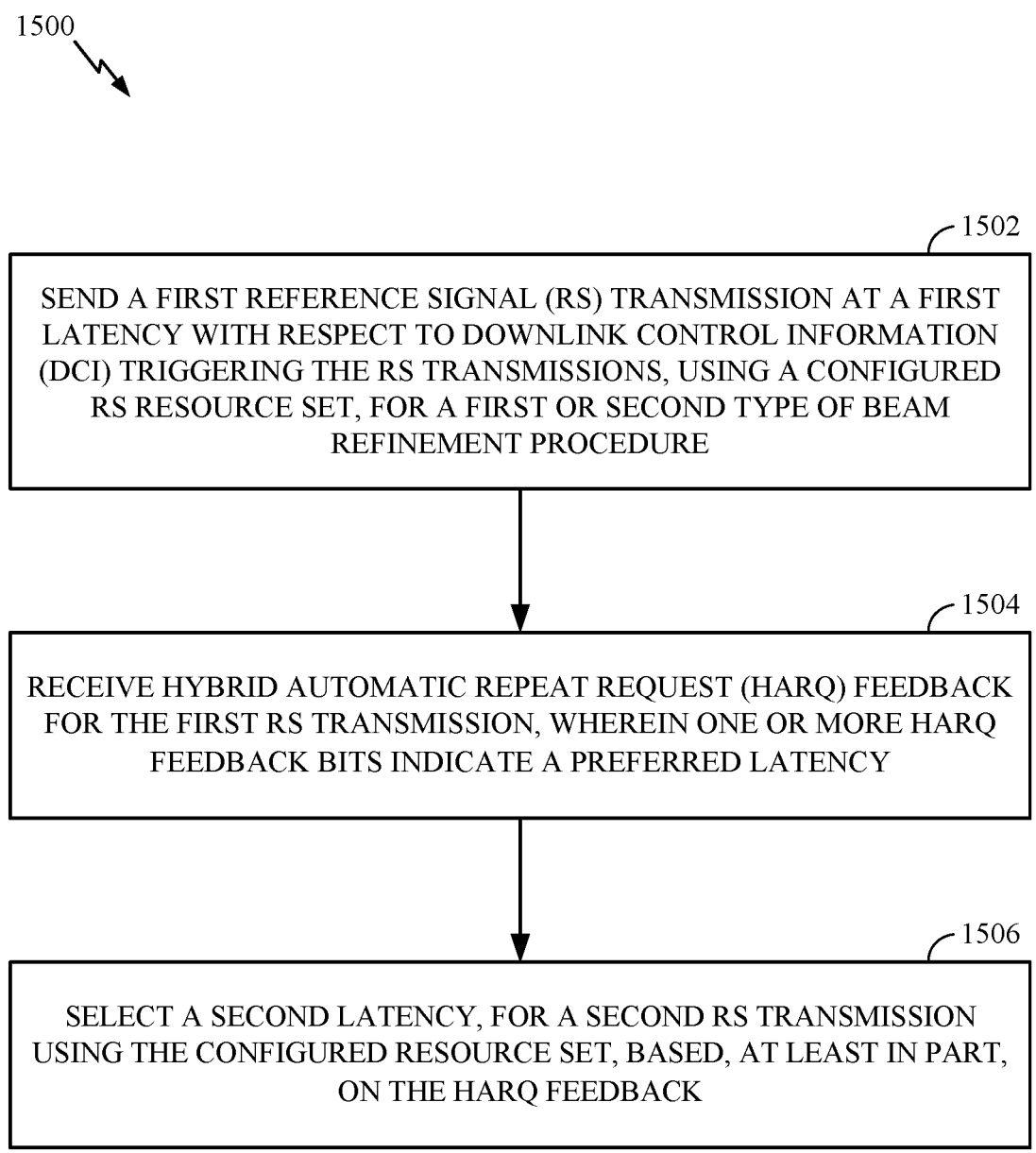
FIG. 15 illustrates example operations by a BS for determining latency for beam refinement procedure based on HARQ feedback signaling, in accordance with certain aspects of the present disclosure.

FIG. 15 illustrates example operations 1500 for determining latency for beam refinement procedure based on HARQ feedback signaling, in accordance with certain aspects of the present disclosure. Operations 1500 may be performed, for example, by a BS.

Operations 1500 begin, at 1502, by sending a first RS transmission (e.g., A-CSI-RS) at a latency with respect to DCI triggering the RS transmissions, using a configured RS resource set, for a first (e.g., P2 or inter-antenna module beam switching) or second type (e.g., P3 and/or inter-antenna module beam switching) of beam refinement procedure. The BS may configure the RS resource sets as described above. In some examples, the BS may receive an indication of two latencies from the UE and blindly selects the first or second latency for the first RS transmission.

At 1504, the BS receives HARQ feedback for the first RS transmission. One or more HARQ feedback bits indicate a preferred latency.

According to certain aspects, if there are free bits in ACK/NACK signaling, the UE can use the free bits to indicate a preferred latency. For example, the UE can indicate a preferred latency for the P3 procedure (e.g., if the ACK/NACK is for A-CSI-RS with Rep=ON), a preferred latency for the P2 procedure (e.g., if the ACK/NACK is for A-CSI-RS with Rep=OFF), a preferred latency for the next RS transmission regardless whether for P2 or P3 procedure, or a preferred latency for P2 and a preferred latency for P3 (e.g., using 2 bits). Instead of P2 and P3, the beam refinements can also be classified by intra-module and inter-module beam refinements with corresponding preferred latencies signaled from UE.

In some examples, the UE signals a desired beam switch latency for the P3 procedure. In this case, if the actual scheduled beam switch latency between the DCI and RS transmission is less than the signaled desired latency, then the UE may use a NACK or some bits in the ACK/NACK signal to indicate that the UE did not perform, or complete, the P3 UE receive beam sweep because the latency was too short for the UE to switch beams. On the other hand, if the actual scheduled beam switch latency between the DCI and RS transmission is equal to greater than the signaled desired latency, then the UE may use some bits in the ACK/NACK signal to indicate that the that the UE performed the UE receive beam sweep but the best UE receive beam is the current UE receive beam (if that is the case when the UE performs the UE receive beam sweep). In some examples, the HARQ feedback is multiplexed on a PUSCH (e.g., if there is an UL grant for the PUSCH in the triggering DCI).

At 1506, the BS selects a latency, for a second RS transmission using the configured resource set, based, at least in part, on the HARQ feedback.

Figure 16:
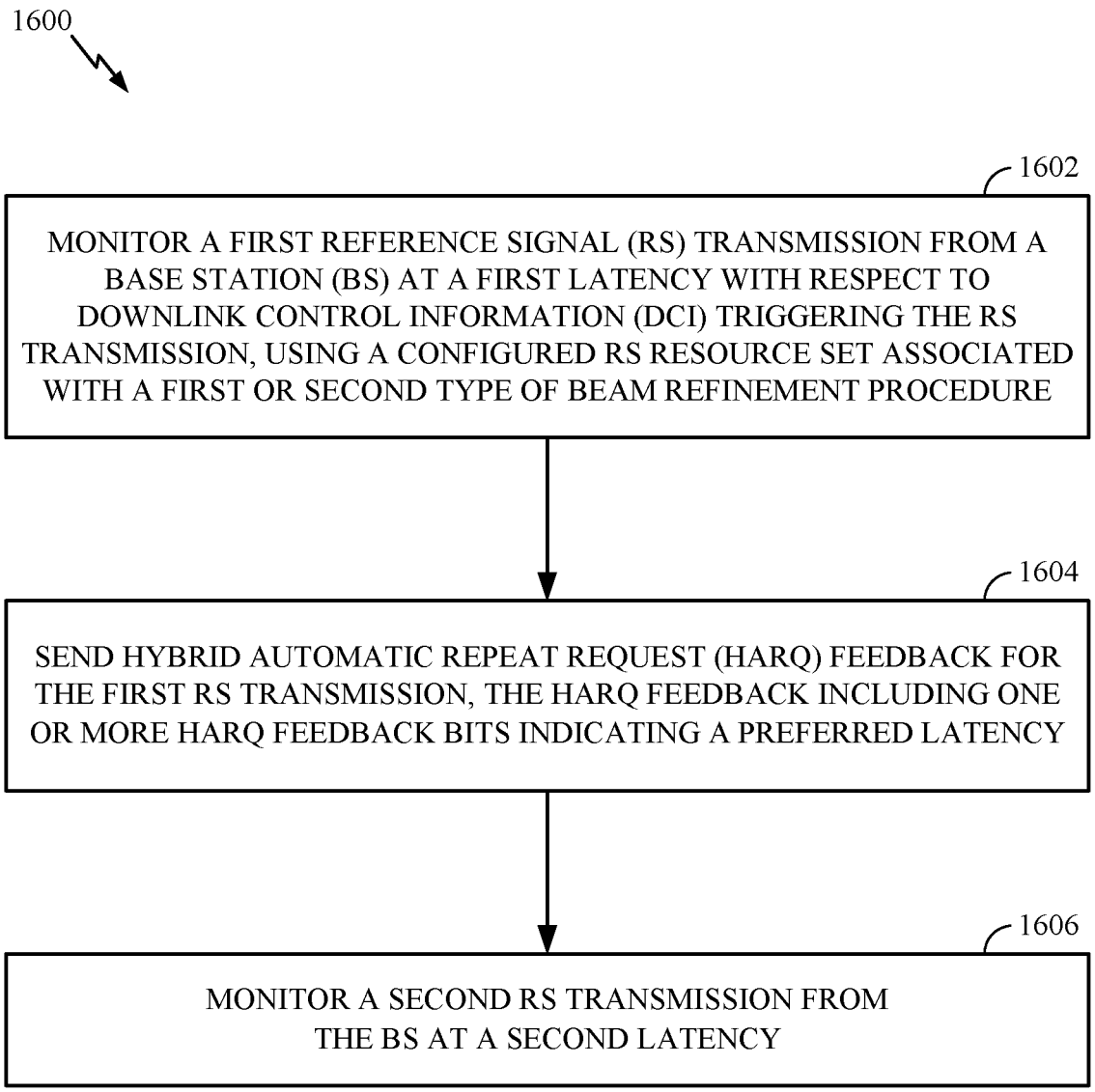
FIG. 16 illustrates example operations by a UE for signaling a preferred latency in HARQ feedback for a beam refinement procedure, in accordance with certain aspects of the present disclosure.

FIG. 16 illustrates example operations 1600 for signaling a preferred latency in HARQ feedback for a beam refinement procedure, in accordance with certain aspects of the present disclosure. Operations 1600 may be performed, for example, by a UE. Operations 1600 may be complementary to the operations 1500 by the BS. Operations 1600 begin, at 1602, by monitoring a first RS transmission from a BS at a latency with respect to DCI triggering the RS transmission, using a configured RS resource set, for a first or second type of beam refinement procedure. At 1604, the UE sends HARQ feedback for the first RS transmission including one or more HARQ feedback bits indicating a preferred latency. At 1606, the UE monitors a second RS transmission from the BS.

Figure 17:
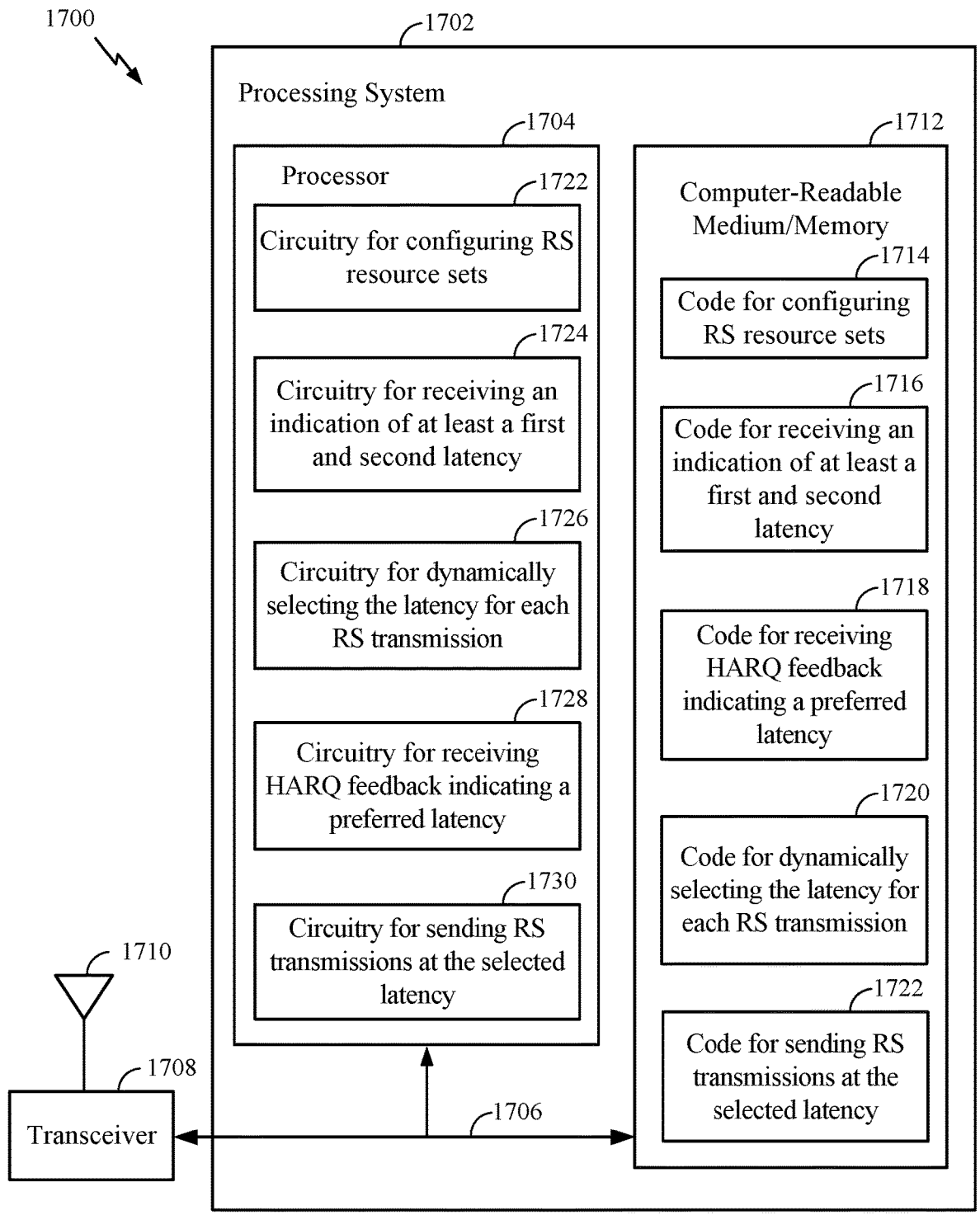
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 12 and/or FIG. 15. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 12 and/or FIG. 15, or other operations for performing the various techniques discussed herein for a dynamic beam-switching latency for beam refinement procedures. In certain aspects, computer-readable medium/memory 1712 stores code 1714 for configuring RS resource sets; code 1716 for receiving an indication of at least a first and second latency; code 1718 for receiving HARQ feedback indicating a preferred latency; code 1720 for dynamically selecting the latency for each RS transmission; and/or code 1722 sending RS transmissions at the selected latency. In certain aspects, the processor 1704 has circuitry configured to implement the code stored in the computer-readable medium/memory 1712. The processor 1704 includes circuitry 1724 for configuring RS resource sets; circuitry 1726 for receiving an indication of at least a first and second latency; circuitry 1728 for receiving HARQ feedback indicating a preferred latency; circuitry 1730 for dynamically selecting the latency for each RS transmission; and/or circuitry 1732 sending RS transmissions at the selected latency.

Figure 18:
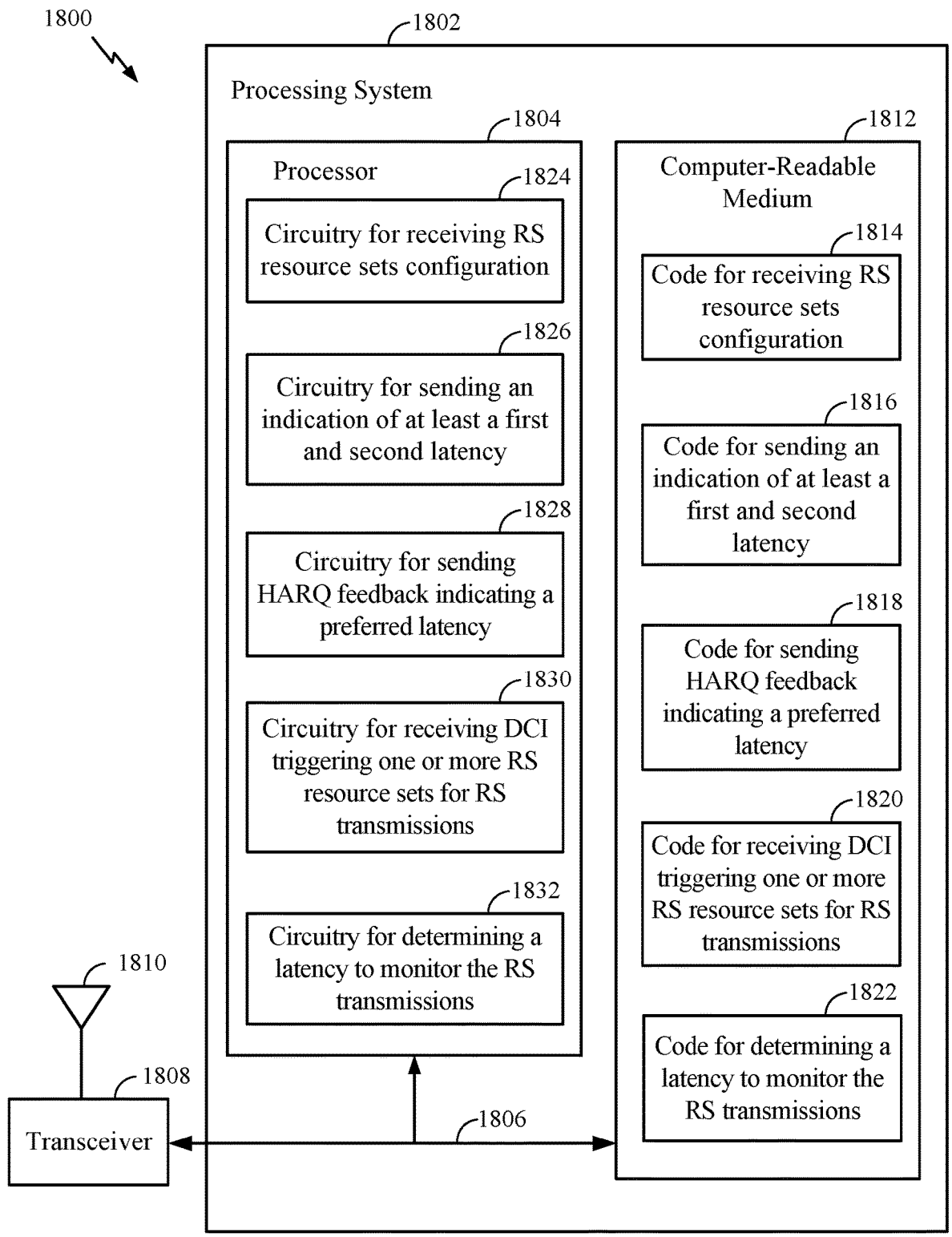
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 13 and/or FIG. 16. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 13 and/or FIG. 16, or other operations for performing the various techniques discussed herein for a dynamic beam-switching latency for beam refinement procedures. In certain aspects, computer-readable medium/memory 1812 stores code 1814 for receiving a configuration of RS resource sets; code 1816 for sending an indication of at least a first and second latency; code 1818 for sending HARQ feedback indicating a preferred latency; code 1820 for receiving DCI triggering one or more RS resource sets for RS transmission; and/or code 1822 for determining a latency to monitor the RS transmissions. In certain aspects, the processor 1804 has circuitry configured to implement the code stored in the computer-readable medium/memory 1812. The processor 1804 includes circuitry 1824 for receiving a configuration of RS resource sets; circuitry 1826 for sending an indication of at least a first and second latency; circuitry 1828 for sending HARQ feedback indicating a preferred latency; circuitry 1830 for receiving DCI triggering one or more RS resource sets for RS transmission; and/or circuitry 1832 for determining a latency to monitor the RS transmissions.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 12-13 and FIGS. 15-16.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
monitoring a first reference signal (RS) transmission from a base station (BS), the monitoring being at a first latency after downlink control information (DCI) triggering the RS transmission, the RS transmission using an RS resource set of one or more configured RS resource sets and associated with a first type of beam refinement procedure or with a second type of beam refinement procedure;
sending hybrid automatic repeat request (HARQ) feedback for the first RS transmission, the HARQ feedback including one or more HARQ feedback bits indicating a preferred latency; and
monitoring a second RS transmission from the BS at a second latency after another DCI.

2. The method of claim 1, further comprising:
receiving signaling configuring the UE with one or more RS resource sets, wherein each of the one or more RS resource sets is associated with the first type of beam refinement procedure or with the second type of beam refinement procedure; and
sending an indication of a first latency associated with intra-antenna module switching and a second latency, longer than the first latency, associated with inter-antenna module switching.

3. The method of claim 1, wherein the RS comprises an aperiodic channel state information RS (A-CSI-RS).

4. The method of claim 1, wherein the first type of beam refinement procedure comprises:
receiving repeated RS transmissions from the BS over a plurality of symbols using different BS transmit beams;
measuring the repeated RS transmissions with one or more UE receive beams in a same UE antenna panel; and
based on the measuring, sending an indication to the BS of at least one of: one or more BS transmit beams of the different BS transmit beams or a signal quality associated with the one or more BS transmit beams.

5. The method of claim 1, wherein the second type of beam refinement procedure comprises:
receiving repeated RS transmissions from the BS over a plurality of symbols using a same BS transmit beam; and
measuring the repeated RS transmissions with UE receive beams in different UE antenna panels.

6. The method of claim 5, wherein the second type of beam refinement procedure further comprises, based on the measuring, sending an indication of at least one of: one or more UE receive beams in the different antenna panels or a signal quality associated with the one or more UE receive beams.

7. The method of claim 5, wherein the different UE antenna panels include at least one active antenna panel and at least one idle antenna panel when the RS transmission is triggered by the DCI.

8. The method of claim 1, wherein the one or more feedback bits indicate:
a first preferred latency for the first type of beam refinement procedure;
a second preferred latency for the second type of beam refinement procedure;
both the first preferred latency and the second preferred latency; or
a third preferred latency for regardless of the type of beam refinement procedure.

9. The method of claim 1, further comprising, when the latency between the DCI and the first RS transmission or between the other DCI and the second RS transmission is smaller than the indicated preferred latency, sending HARQ feedback bits to the BS indicating the UE did not perform the first beam refinement procedure or the second beam refinement procedure.

10. The method of claim 1, further comprising, when the latency between the DCI and the first RS transmission or between the other DCI and the second RS transmission is equal to or larger than the indicated preferred latency, sending HARQ feedback bits to the BS indicating the UE performed the first beam refinement procedure or the second beam refinement procedure.

11. The method of claim 1, wherein the HARQ feedback is multiplexed on a physical uplink shared channel (PUSCH).

12. An apparatus for wireless communications, comprising:
a memory comprising computer-executable instructions; and
one or more processors configured to execute the computer-executable instructions and cause the apparatus to:
monitor a first reference signal (RS) transmission from a base station (BS), the monitoring being at a first latency after downlink control information (DCI) triggering the RS transmission, the RS transmission using an RS resource set of one or more configured RS resource sets and associated with a first type of beam refinement procedure or with a second type of beam refinement procedure;
send hybrid automatic repeat request (HARQ) feedback for the first RS transmission, the HARQ feedback including one or more HARQ feedback bits indicating a preferred latency; and
monitor a second RS transmission from the BS at a second latency after another DCI.

13. The apparatus of claim 12, wherein the one or more processors execute the computer-executable instructions and further cause the apparatus to:
receive signaling configuring the apparatus with one or more RS resource sets, wherein each of the one or more RS resource sets is associated with the first type of beam refinement procedure or with the second type of beam refinement procedure; and
send an indication of a first latency associated with intra-antenna module switching and a second latency, longer than the first latency, associated with inter-antenna module switching.

14. The apparatus of claim 12, wherein the RS comprises an aperiodic channel state information RS (A-CSI-RS).

15. The apparatus of claim 12, wherein the first type of beam refinement procedure comprises:
receiving repeated RS transmissions from the BS over a plurality of symbols using different BS transmit beams;
measuring the repeated RS transmissions with one or more receive beams of the apparatus in a same antenna panel; and
based on the measuring, sending an indication to the BS of at least one of: one or more BS transmit beams of the different BS transmit beams or a signal quality associated with the one or more BS transmit beams.

16. The apparatus of claim 12, wherein the second type of beam refinement procedure comprises:
receiving repeated RS transmissions from the BS over a plurality of symbols using a same BS transmit beam; and
measuring the repeated RS transmissions with receive beams of the apparatus in different antenna panels.

17. The apparatus of claim 16, wherein the second type of beam refinement procedure further comprises, based on the measuring, sending an indication of at least one of: one or more receive beams of the apparatus in the different antenna panels or a signal quality associated with the one or more receive beams of the apparatus.

18. The apparatus of claim 16, wherein the different antenna panels include at least one active antenna panel and at least one idle antenna panel when the RS transmission is triggered by the DCI.

19. The apparatus of claim 12, wherein the one or more feedback bits indicate:
a first preferred latency for the first type of beam refinement procedure;
a second preferred latency for the second type of beam refinement procedure;
both the first preferred latency and the second preferred latency; or
a third preferred latency for regardless of the type of beam refinement procedure.

20. The apparatus of claim 12, wherein the one or more processors execute the computer-executable instructions and further cause the apparatus to, when the latency between the DCI and the first RS transmission or between the other DCI and the second RS transmission is smaller than the indicated preferred latency, send HARQ feedback bits to the BS indicating the apparatus did not perform the first beam refinement procedure or the second beam refinement procedure.

21. The apparatus of claim 12, wherein the one or more processors execute the computer-executable instructions and further cause the apparatus to, when the latency between the DCI and the first RS transmission or between the other DCI and the second RS transmission is equal to or larger than the indicated preferred latency, send HARQ feedback bits to the BS indicating the apparatus performed the first beam refinement procedure or the second beam refinement procedure.

22. The apparatus of claim 12, wherein the HARQ feedback is multiplexed on a physical uplink shared channel (PUSCH).

23. An apparatus for wireless communications, comprising:
means for monitoring a first reference signal (RS) transmission from a base station (BS), the monitoring being at a first latency after downlink control information (DCI) triggering the RS transmission, the RS transmission using an RS resource set of one or more configured RS resource sets and associated with a first type of beam refinement procedure or with a second type of beam refinement procedure;
means for sending hybrid automatic repeat request (HARQ) feedback for the first RS transmission, the HARQ feedback including one or more HARQ feedback bits indicating a preferred latency; and
means for monitoring a second RS transmission from the BS at a second latency after another DCI.

24. The apparatus of claim 23, further comprising:
means for receiving signaling configuring the apparatus with one or more RS resource sets, wherein each of the one or more RS resource sets is associated with the first type of beam refinement procedure or with the second type of beam refinement procedure; and
means for sending an indication of a first latency associated with intra-antenna module switching and a second latency, longer than the first latency, associated with inter-antenna module switching.

25. The apparatus of claim 23, wherein the RS comprises an aperiodic channel state information RS (A-CSI-RS).

26. The apparatus of claim 23, wherein the first type of beam refinement procedure comprises:
means for receiving repeated RS transmissions from the BS over a plurality of symbols using different BS transmit beams;
means for measuring the repeated RS transmissions with one or more receive beams of the apparatus in a same antenna panel; and
means for, based on the measuring, sending an indication to the BS of at least one of: one or more BS transmit beams of the different BS transmit beams or a signal quality associated with the one or more BS transmit beams.

27. The apparatus of claim 23, wherein the second type of beam refinement procedure comprises:
means for receiving repeated RS transmissions from the BS over a plurality of symbols using a same BS transmit beam; and
means for measuring the repeated RS transmissions with receive beams of the apparatus in different antenna panels.

28. The apparatus of claim 27, wherein the second type of beam refinement procedure further comprises, based on the measuring, sending an indication of at least one of: one or more receive beams of the apparatus in the different antenna panels or a signal quality associated with the one or more receive beams of the apparatus.

29. The apparatus of claim 27, wherein the different antenna panels of the apparatus include at least one active antenna panel and at least one idle antenna panel when the RS transmission is triggered by the DCI.

30. A computer readable medium storing computer executable code thereon for wireless communications by a user equipment (UE), comprising:
code for monitoring a first reference signal (RS) transmission from a base station (BS), the monitoring being at a first latency after downlink control information (DCI) triggering the RS transmission, the RS transmission using an RS resource set of one or more configured RS resource sets and associated with a first type of beam refinement procedure or with a second type of beam refinement procedure;
code for sending hybrid automatic repeat request (HARQ) feedback for the first RS transmission, the HARQ feedback including one or more HARQ feedback bits indicating a preferred latency; and
code for monitoring a second RS transmission from the BS at a second latency after another DCI.

* * * * *